(12) United States Patent
Morrel-Samuels

(10) Patent No.: US 7,593,861 B2
(45) Date of Patent: Sep. 22, 2009

(54) EMPLOYEE ASSESSMENT TOOL

(75) Inventor: Palmer Morrel-Samuels, Chelsea, MI (US)

(73) Assignee: Employee Motivation & Performance Assessment, Inc., Ann Arbor, MI (US)

( * ) Notice: Subject to any disclaimer, the term of this patent is extended or adjusted under 35 U.S.C. 154(b) by 1423 days.

(21) Appl. No.: 10/279,159

(22) Filed: Oct. 24, 2002

(65) Prior Publication Data

US 2003/0078804 A1 Apr. 24, 2003

Related U.S. Application Data

(60) Provisional application No. 60/346,249, filed on Oct. 24, 2001.

(51) Int. Cl.
*G06F 17/60* (2006.01)
(52) U.S. Cl. .................. 705/10; 705/7; 705/11
(58) Field of Classification Search ............ None
See application file for complete search history.

(56) References Cited

U.S. PATENT DOCUMENTS

| | | | | |
|---|---|---|---|---|
| 5,795,155 | A * | 8/1998 | Morrel-Samuels | 434/107 |
| 6,007,340 | A * | 12/1999 | Morrel-Samuels | 434/236 |
| 6,093,026 | A * | 7/2000 | Walker et al. | 434/322 |
| 6,477,504 | B1 * | 11/2002 | Hamlin et al. | 705/10 |
| 6,513,014 | B1 * | 1/2003 | Walker et al. | 705/10 |
| 6,556,974 | B1 * | 4/2003 | D'Alessandro | 705/10 |
| 6,895,405 | B1 * | 5/2005 | Choi et al. | 707/101 |

FOREIGN PATENT DOCUMENTS

JP 2001350887 A * 12/2001

OTHER PUBLICATIONS

Hui (1985). The Instability of Response Sets. Public Opinion Quarterly, Summer85, vol. 49 Issue 2, p. 253, 8p, 2 charts, 1 graph; (AN 5414572).*
Morrel-Samuels, P. (2002). Getting the truth into workplace surveys. Harvard Bus. Rev., vol. 80, No. 2, pp. 111-118.*
Burkey, J.; Kuechler, W.L. (2003). Web-based surveys for corporate information gathering: a bias-reducing design framework. Professional Communication, IEEE Transactions on, vol. 46, No. 2, pp. 81-93.*
Bosnjak. M. and T. L. Tuten (2001). Classifying response Behaviors in web-based surveys. J. Computer-Mediated Communication, vol. 6, No. 3. [retrieved Jan. 10, 2008], downloaded from <url: http://jcmc.indiana.edu/vol6/issue3/boznjak.html.*

(Continued)

*Primary Examiner*—Albert DeCady
*Assistant Examiner*—Dave Robertson
(74) *Attorney, Agent, or Firm*—Harness, Dickey & Pierce, PLC

(57) ABSTRACT

A method of providing employee assessment services includes negotiating with an employer to administer surveys to its employees, and obtaining performance metrics relating to performance of a business of the employer. A survey is designed to obtain feature metrics relating to features of business culture germane to the business of the employer, and the survey is administered to the employees via a web-based interface. Obtained survey data are analyzed to identify statistically significant, noteworthy, consistent, and non-contradictory linkages between the feature metrics and the performance metrics, and these linkages are communicated to the employer in a readily understandable fashion.

13 Claims, 28 Drawing Sheets

OTHER PUBLICATIONS

Patterson Pfaffenberger. Statistical Methods for Business and Economics. Irwin: 1981, "Chapter 15: Multiple Correlation and Regression" pp. 481-519.*

Certificate of Registration for a Nondramatic Literary Work entitled "Anonymous Indexing", by Palmer Morrel-Samuels, United States Copyright Office, Jun. 21, 1999.

Certificate of Registration for a Nondramatic Literary Work entitled "Balanced Scorecard Analysis Table", by Palmer Morrel-Samuels, United States Copyright Office, Jun. 21, 1999.

Hierarchical Linear Models, Applications and Data Analysis Methods, $2^{nd}$ Edition, by Stephen W. Raudenbush and Anthony S. Bryk, Ch. 2, pp. 16-37; Ch. 4, pp. 68-95; Ch. 9, pp. 252-287.

* cited by examiner

| | S1: AVE LEADERSHIP & MGT | S2: AVE COMMUNICATION | S3: AVE QUALITY | S4: AVE JOB & EDUCATION | EMI |
|---|---|---|---|---|---|
| A] % of Net Income Target | | | | | |
| B] Cost Containment | | | | | |
| C] Meeting Expected Mkt Share | | | | | |
| D] Net Income actual | | | | | |
| E] Net Rev FY99 | | | | | |
| F] Net Rev Growth % | | | | | |
| G] Productivity % | | | | | |
| H] Remainder of $250K per Doc | | | | | |
| I] Injury Prevention | | | | | |
| J] Lost-Day Prevention | | | | | |
| K] Retention of EEs % (inc JA) | | | | | |
| L] Retention of EEs % (w/o JA) | | | | | |
| M] Retention of RNs % (inc JA) | | | | | |
| N] Retention of RNs % (w/o JA) | | | | | |
| O] Fall Prevention | | | | | |
| P] PSAT | | | | | |
| Q] ReadmissionPrevention | | | | | |
| R] Speed of Treatment | | | | | |
| S] EE Headcount | | | | | |
| T] RN Headcount | | | | | |
| U] Salaries and Benefits | | | | | |

FIG. 23

| | TEAMWORK 2 | ENSATION | EMI (Motivation) | Accomodating Mgr-Ldr-Mentor |
|---|---|---|---|---|
| Sales Ave | | | | |
| Sales Growth | | | | |
| PBIT Ave | | | | |
| PBIT Growth | | | | |
| EMI_(Motivation) | | | | |
| Headcount Growth | | | | |
| PBIT per EE | | | | |
| Productivity (Q26) | | | | |
| Cust. Satisfaction (Q27) | | | | |
| Value / Profit (Q28) | | | | |
| Quality (Q29) | | | | |
| Perceived Motivation (Q30) | | | | |
| Vocal Support | | | | |

TEAMWORK 2 callout:
- My Team Members Provide...
- My Team Members Are ...
- My Team Does A Good Job Of ...
- My Team's Products/Services Are ...
- My Team Is An Excellent Example Of ...

FIG. 24

| | TEAMWORK 2 | LEADERSHIP | MANAGEMENT | WORK COND | COMPENSATION | EMI (Motivation) | Accomodating Mgr-Ldr-Mentor |
|---|---|---|---|---|---|---|---|
| Sales Ave | | | | | | | |
| Sales Growth | | | | | | | |
| PBIT Ave | | | | | | | |
| PBIT Growth | | | | | | | |
| EMI_(Motivation) | | | | | | | |
| Headcount Growth | | | | | | | |
| PBIT per EE | | | | | | | |
| Productivity (Q26) | | | | | | | |
| Cust. Satisfaction (Q27) | | | | | | | |
| Value / Profit (Q28) | | | | | | | |
| Quality (Q29) | | | | | | | |
| Perceived Motivation (Q30) | | | | | | | |
| Vocal Support | | | | | | | |

COMPUTATIONAL RULES

- Assign points systematically for each statistically significant finding.
  - $r = .01$ to $.20$ yields 1 pt
  - $r = .21$ to $.40$ yields 2 pt
  - $r = .41$ or above yields 3 pt
  - significant MANOVA B yields 1 pt
  - significant Regression B yields 1 pt
  - Non-significant results and correlations below .01 yield no points.
- Add points in each cell. Total must $> P_{50}$ in the matrix to be listed as a consistent linkage; totals $> P_{80}$ are considered especially strong. Linkages MUST be verified by at least one significant correlation, and all those correlations MUST have the same valence for the cell to be labeled as a linkage.

FIG. 26

|   | TEAMWORK | LEADERSHIP | MANAGEMENT | WORK COND | COMPENSATION | EMI (Motivation) | Accomodating Mgr-Ldr-Mentor |
|---|---|---|---|---|---|---|---|
|  | My Team Members Provide... | | | | | | |
|  | My Team Members Are ... | | | | | | |
| Sales Ave | My Tear Model 1: Correlation using disaggregated data | | | | | | |
| Sales Growth | My Tear Model 2: Correlatio | | | | | | |
|  | My Tear Model 3: Correlatio | | | | | | |
| PBIT Ave | Model 4: Regression | | | | | | |
| PBIT Growth | Model 5: Regressior | | | | | | |
|  | Model 6: Regressior | | | | | | |
|  | Model 7: Regressior | | | | | | |
| EMI_(Motivation) | Model 8: Regressior | | | | | | |
| Headcount Growth | Model 9: MANOV | | | | | | |
| PBIT per EE | Model 10: MANOV | | | | | | |
|  | Model 11: MANOV | | | | | | |
| Productivity (Q26) | Model 12: MANOV | | | | | | |
| Cust. Satisfaction (Q27) | Model 13: MANOV | | | | | | |
| Value / Profit (Q28) | Model 14: Regressio | | | | | | |
| Quality (Q29) | | | | | | | |
| Perceived Motivation (Q30) | | | | | | | |
| Vocal Support | | | | | | | |

COMPUTATIONAL RULES

- Assign points systematically for each statistically significant finding.
  - $r = .01$ to $.20$ yields 1 pt
  - $r = .21$ to $.40$ yields 2 pt
  - $r = .41$ or above yields 3 pt
  - significant MANOVA B yields 1 pt
  - significant Regression B yields 1 pt
  - Non-significant results and correlations below $.01$ yield no points.
- Add points in each cell. Total must $> P_{50}$ in the matrix to be listed as a consistent linkage; totals $> P_{80}$ are considered especially strong. Linkages MUST be verified by at least one significant correlation, and all those correlations MUST have the same valence for the cell to be labeled as a linkage.

FIG. 27

| | S1: AVE LEADERSHIP & MGT | S2: AVE COMMUNICATION | S3: AVE QUALITY | S4: AVE JOB & EDUCATION | EMI |
|---|---|---|---|---|---|
| A] % of Net Income Target | | | | negative | |
| B] Cost Containment (% top CPE) | | | | | |
| C] Meeting Expected Mkt Share | | positive | | | |
| D] Net Income actual | | | | | |
| E] Net Rev FY99 (less I+C+AR) | | | | | |
| F] Net Rev Growth % | positive | | | | |
| G] Productivity % | | | | | |
| H] Remainder of $250K per Doc | | | | | |
| I] Injury Prevention (20-IR) | | positive | positive | | |
| J] Lost-Day Prevention (20-LDR) | | | | negative | |
| K] Retention of EEs % (inc JA) | | | | | |
| L] Retention of EEs % (w/o JA) | | | | | |
| M] Retention of RNs % (inc JA) | | | positive | | |
| N] Retention of RNs % (w/o JA) | | positive | positive | | |
| O] Fall Prevention (1-FP100PTD) | | | | | |
| P] PSAT (by H by INS x 1-sd) | | | | | |
| Q] ReadmissionPrevention(10-UR) | | | | | |
| R] Speed of Treatment (10-LOS) | | | positive | | |
| S] EE Headcount2 | | | | | positive |
| T] RN Headcount | | | | | negative |
| U] Salaries and Benefits | | | | | |

FIG. 28

EMPLOYEE ASSESSMENT TOOL

CROSS-REFERENCE TO RELATED APPLICATIONS

This application claims the benefit of U.S. Provisional Application No. 60/346,249, filed on Oct. 24, 2001. The disclosure of the above application is incorporated herein by reference.

FIELD OF THE INVENTION

The present invention generally relates to survey systems and methods, and particularly relates to electronic survey design and administration, and to compilation, analysis, and interpretation of data, and to presentation of survey results.

BACKGROUND AND SUMMARY OF THE INVENTION

There is great interest today in identifying factors that effect business performance, and employees are valuable resources of information when it comes to assessing features of business culture. For this reason, it is highly desirable to survey employees to obtain soft metrics relating to features of business culture. With a well-crafted survey garnering a high rate of participation and valid data, it is possible to establish correlations and/or associations between features of business culture and performance of the business. Chief Executive Officers (CEOs), for example, can greatly benefit from the ability to identify and measure these correlations and/or associations, and to plan and act accordingly.

Unfortunately, businesses executives face numerous challenges in surveying their employees. For example, most businesses lack the resources, such as expert personnel, to conduct surveys of with high reliability (which generally means replicability) and high validity (which generally means accuracy). Also, in-house surveying efforts are often thwarted by employees' reluctance to criticize features of business culture when survey data are available to the business in a form that can potentially reveal the responses of a particular respondent. For these reasons, the present invention uses an outside consulting company to conduct surveys and hold data of particular respondents in strict confidence while presenting results of a subsequent analysis to the employer in an aggregated form.

An outside consulting company surveying employees to obtain useful data faces challenges of its own. For example, it can be difficult to administer a hard copy (paper) survey to employees that have different schedules and locations. Mail-based distribution of surveys, and/or electronic (Web-based) distribution of printable surveys to employees at home or at work are solutions used according to various alternative embodiments of the present invention. The distribution at work still presents employees with the prospect of having to mail data from work, leading to potential interception by in-house personnel, or taking the survey off of business premises for completion and/or mailing. The mail-based distribution at home, however, places a burden on the outside consulting company and/or employer to mail the surveys to potentially thousands of addresses in various countries. For these reasons, the present invention preferably implements a Web-based distribution of an automated electronic survey that employees can take on or off business premises.

Use of a Web-based distribution of an automated, electronic survey to employees, although overcoming many challenges and presenting certain inherent advantages, faces further challenges due to typically decreased participation and/or validity of data obtained with automated, electronic surveys as compared to paper surveys. For example, employees are less likely to participate due to fears relating to confidentiality, difficulty of access, poor presentation of survey content, and/or inability to read ahead or scan the survey in its entirety prior to participating. Also, respondents to automated electronic surveys are more likely to give more extreme responses on an automated electronic survey and/or otherwise skew the data by giving generally higher scores to questions. For these reasons, the present invention provides an automated electronic survey with access, information, presentation, and content features that respectively: (a) assist the user in locating, initiating, navigating, completing, and submitting the survey; (b) assist the user in perceiving, interpreting, and completing the survey; (c) enforce psychologically advantageous communication capabilities; and (d) obtain data in a statistically quantifiable manner, such that respondent behavior can be automatically monitored during survey administration to detect potential inaccuracies of and offer respondents opportunities to review and change the potentially invalid responses.

Even with valid data successfully obtained by an outside consulting company, a still further challenge is faced in presenting results to the employer in a manner that can be readily understood. For example, in many organizational settings, identification of linkages between business performance and features of corporate culture is best accomplished using Hierarchical Linear Modeling (HLM). HLM identifies correlations and/or associations as correlation coefficients and/or multiple regression coefficients that control for various potentially significant confounding factors. The values and interrelationships between these coefficients, while speaking volumes to the survey expert, have relatively opaque meanings when presented to CEOs and the executives who report to them, primarily because such executives typically lack training in survey methodology and multivariate inferential statistics. Thus, the present invention identifies links between business culture and features of corporate culture based on statistical significance of the coefficients and magnitudes of the coefficients relative to predetermined thresholds, where all statistically significant coefficients of sufficient magnitude relating to a particular correlation and/or association are required to be non-contradictory (similarly signed). A resulting table of significant, consistent, and non-contradictory links of various relative strengths is then presented to the employer in a readily understandable manner.

The employee assessment tool according to the present invention is advantageous over previous attempts at providing employee assessment services in that employee participation, ease of use, and validity of data are increased, while difficulties in understanding and utilizing data are decreased. Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 4-19 are screenshots depicting various features of an automated electronic survey according to the present invention;

FIGS. 23-28 are tables depicting data compilation, analysis, and presentation according to the present invention.

DETAILED DESCRIPTION OF THE PREFERRED EMBODIMENTS

The employee assessment tool according to the present invention has several associated methods and systems. Variously, these associated methods and systems include methods and systems of doing business, survey design, survey administration, and survey data compilation, interpretation, and presentation. It should be readily understood that while these methods and systems are generally described below with reference to a Web-based implementation, the methods and systems of the present invention can be combined in any number of ways and under various circumstances according to varying needs of clients, new developments in business and technology, and shifting market forces.

Figure 1:
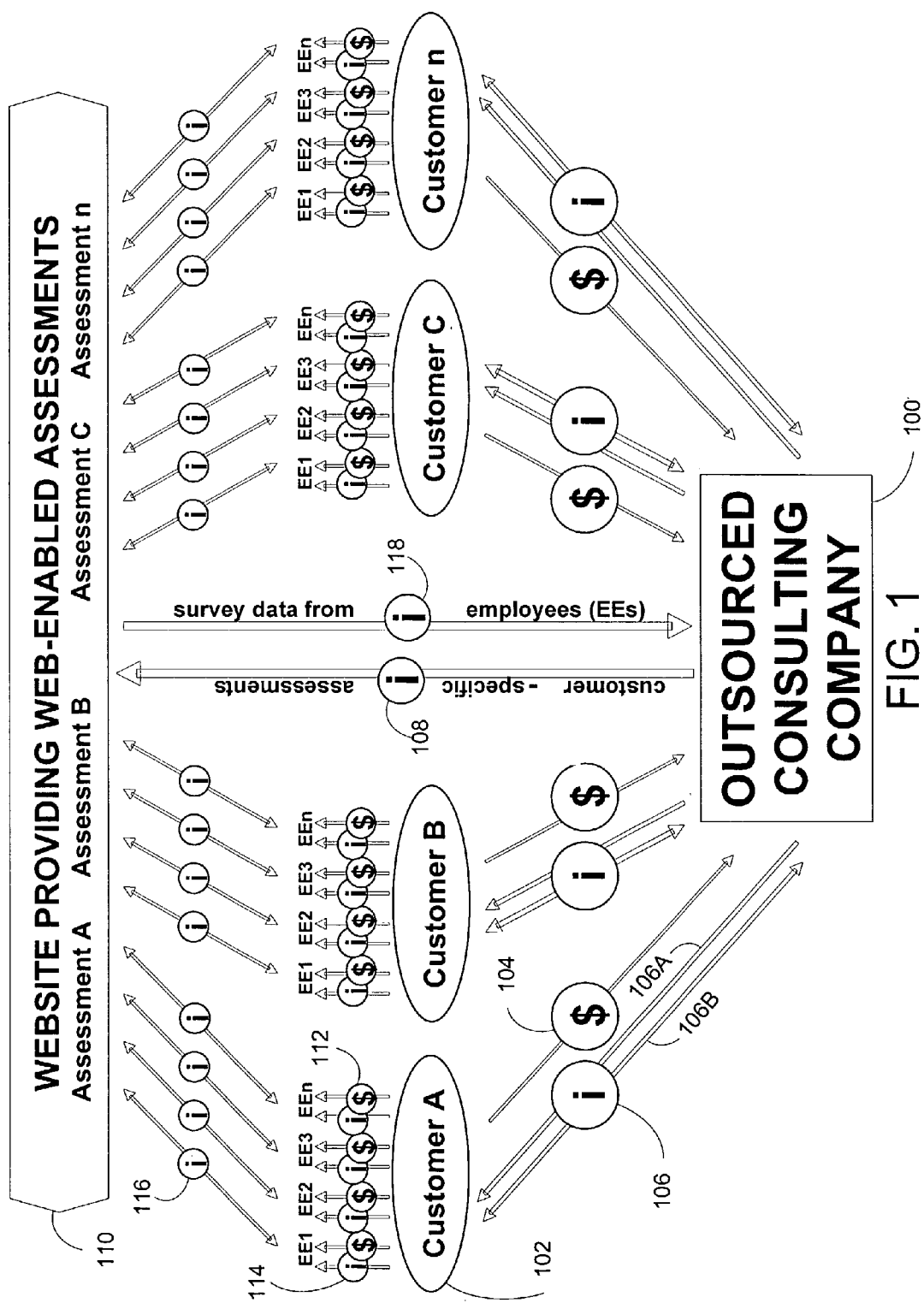
FIG. 1 is a block diagram depicting a business model according to the present invention.

The business model according to the present invention is depicted in FIG. 1, and is shown as implementing a Web-based survey distribution technique. Therein, an outsourced consulting company 100 contracts with a plurality of employers, Customer A through Customer n, corresponding to various business entities. According to the terms of the contract, a particular employer 102 is obligated to provide monetary consideration 104 in exchange for information 106. In particular, the contract requires that the outsourced consulting company 100 conduct surveys of employees, EE1 through EEn, of the employer 102 to assess linkages between performance of a business of the employer 102 and features of corporate culture, and to communicate information 106A relating to these linkages to the employer 102 following successful administration of the surveys. Further, the contract requires a good faith exchange of information 106B between the outsourced consulting company 100 and the employer 102 before design of the survey.

An interviewing process takes place during which the employer 102 provides information 106B containing performance metrics relating to business performance, such as hard metrics relating to sales, production, turnover, and also such as soft metrics including, for example, perceived measures obtained from previously conducted customer satisfaction surveys. This interviewing process also includes the employer 102 providing information 106B relating to features of business culture, such as corporate structure, work practices, and work environment. Contractual terms relating to confidentiality are also typically employed, such as non-disclosure agreements that allow employer 102 to reveal confidential business practices and confidential financial data to company 100, and also such as specific provisions relating to confidentiality of data of individual respondents.

As a result of these contractual provisions and consequent exchanges of information 106B, it is possible for consulting company 100 to design customer specific assessments and provide them as information 108 on a Web-site 110. Employer 102 provides monetary consideration 112 to its employees, EE1 through EEn, plus information 114 relating to the need for and availability of the survey on the website 110. Information 114 includes, for example, a URL for connecting to the website 110, plus a company-wide password for accessing the site and participating in the appropriate survey. The employees, EE1 through EEn, participate in the survey by exchanging information 116, wherein the employees receive information relating to the survey, such as instructions and assurances of confidentiality, and survey content, such as questions with appropriate response mechanisms. The employees, in turn, provide responses that reflect the respondent's perception of the business culture, and this information 118 is provided to company 100. In turn, company 100 compiles information 118 as feature metrics, and performs an analysis relating the feature metrics to the performance metrics of information 106B. Linkages identified during this analysis are then communicated to employer 102 is information 106A.

Figure 2:
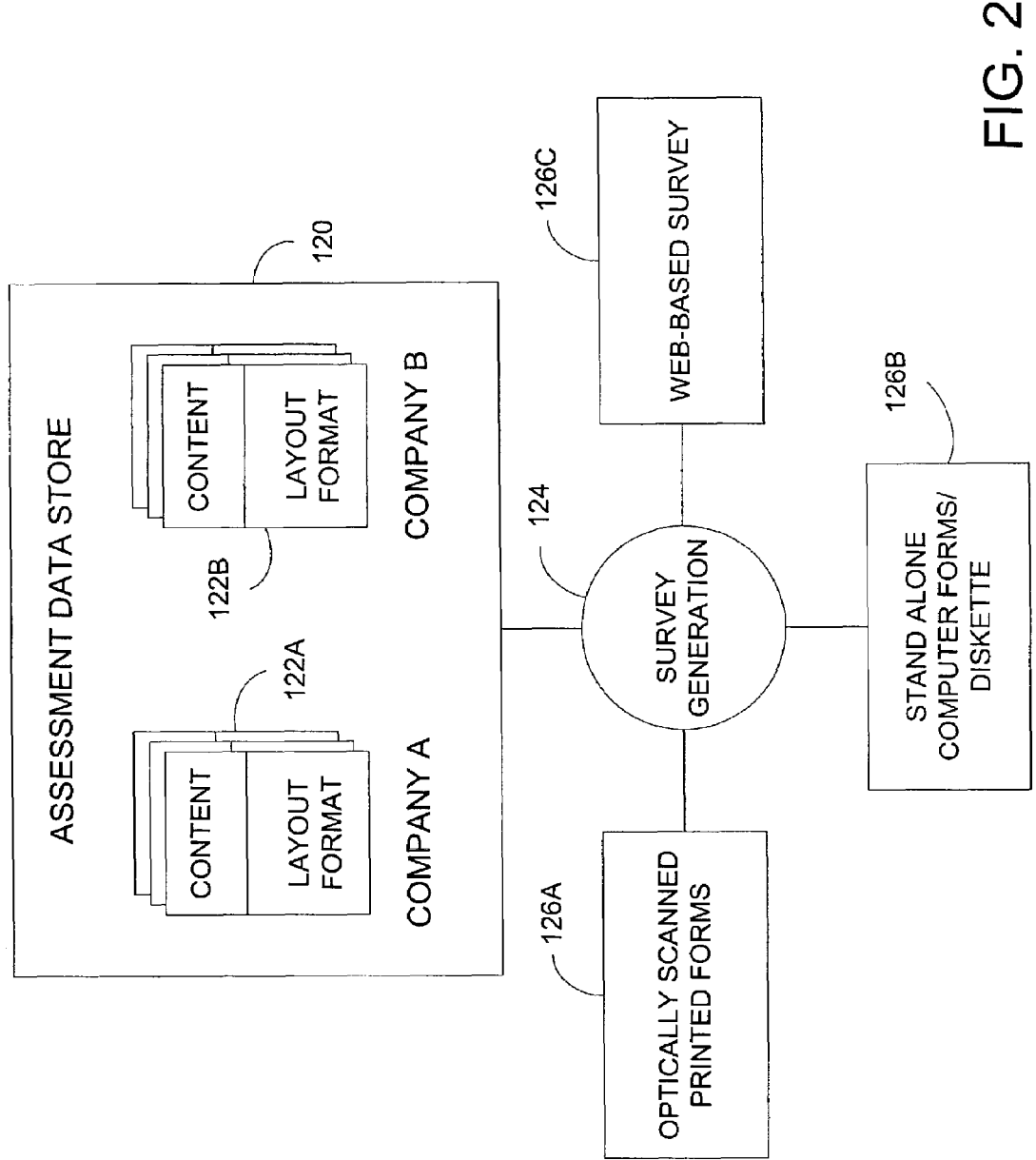
FIG. 2 is a block diagram depicting survey distribution options according to the present invention.

There are various methods available for distributing surveys according to the present invention, and these are explored to some extent in FIG. 2. In particular, an assessment data store 120 containing company specific surveys 122A and 122B can be used to generate surveys as at 124 in many different formats. For example, optically scanned paper survey forms can simply be printed out by the consulting company using readily available scanning software and mailed or otherwise distributed to respondents. Also, the data store 120 can correspond to one or more stand alone computer forms, such as diskettes, which can be distributed directly to respondents. Further, a web-based survey can be used, wherein the respondents interact with an expert system that distributes questions and receives responses. Notably, a survey can have different layouts for different distribution methods, so that it can be distributed in different formats. This distinction is important not only because it allows employees to choose from multiple distribution options in some circumstances, but also because the survey design depends to some degree on the form of distribution.

Figure 3:
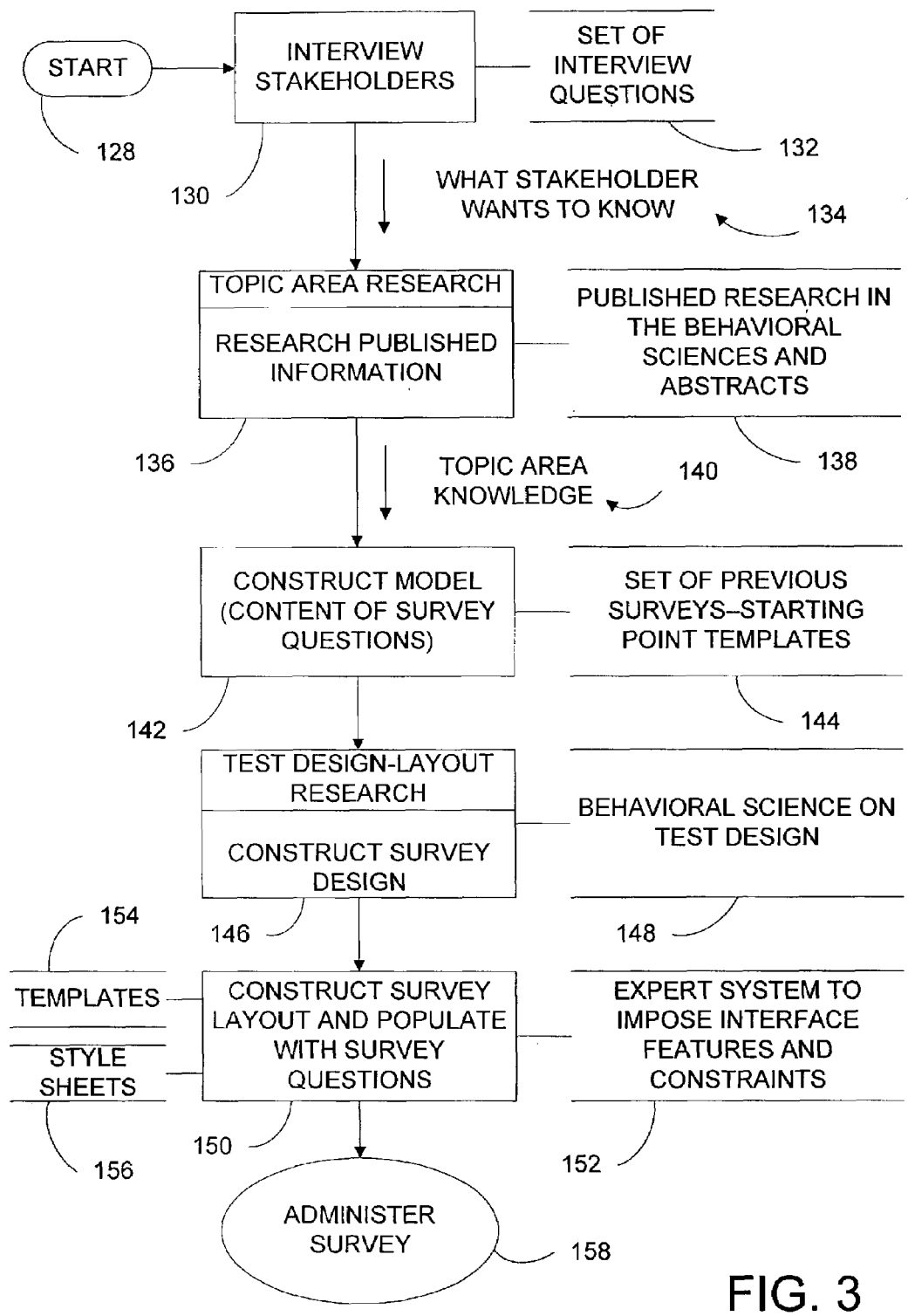
FIG. 3 is a flow chart depicting a method of designing an automated electronic survey according to the present invention.

The process by which an outsourced consulting company obtains information from a customer and designs a survey is explored in FIG. 3. Beginning at 128, the outsourced consulting company interviews the stakeholder (customer/employer) at step 130 using a set of interview questions 132. After determining what the stakeholder wants to know 134, topic area research is performed by researching published information at step 136. This process makes use of published research in the behavioral sciences, as well as electronic databases containing abstracts of published works 138 associated with what the stakeholder wants to know. Specifically, the consulting company synthesizes legal records from Lexis-Nexis, new research in psychometrics and experimental psychology from Psychological Abstracts, interviews with executives, managers, and individual performers at the employer's business, and combines them with the consulting company's own experience. If good hard metrics cannot be obtained on an aspect of business performance, then a perceived measure of that entity may be used to stand as a proxy in cases where published research shows that employee's perceptions accurately track actual performance. In some cases, the perceived measure may be a perceptual measure obtained from other respondents (for example, customers of the company) using other surveys. In other circumstances, the perceived measure may be obtained averaging data from a specific group of employees as part of a different survey or assessment, (for example when managers evaluate the performance of the employees they supervise.)

Once the outsourced consulting company has determined topic area knowledge 140 relating to features of business culture and/or performance metrics, the company can construct a model for survey content (feature specific groups of survey questions) at step 142 using a set of previous surveys 144 as starting point templates. The next step in survey design includes performing layout format research and/or testing at step 146 using behavioral science research on test design 148. At step 150, one or more survey layouts is constructed and associated with a population of survey questions. For a web-based automatic electronic survey, an expert system 152 is included as part of the layout to impose interface features and/or constraints. Templates 154 and/or style sheets 156 can be alternatively and/or additionally used to determine various aspects of the survey's layout. Once the survey is designed, survey administration 158 can occur.

Figure 4:
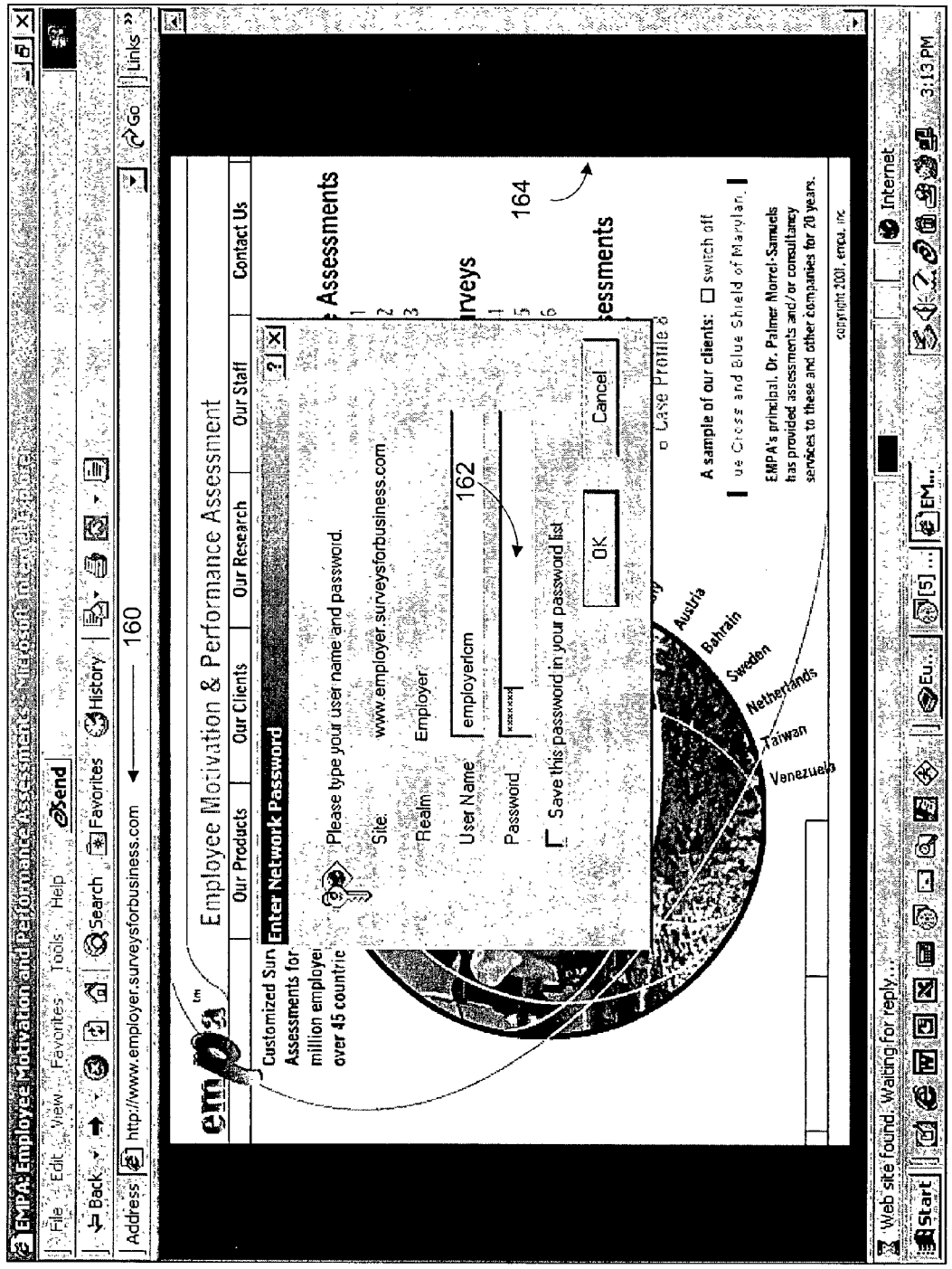

Features of the automated electronic survey according to the present invention are described below with reference to FIGS. 4-19. In general these features serve one or more of four functions relating to content, information, presentation, and access that assist in obtaining data comparable to those obtained in a hardcopy (paper) survey. Used together, these features have been experimentally proven to obtain data with an automated electronic survey that are statistically indistinguishable from those obtained with a hardcopy survey without resorting to weighting techniques or other skew adjustment procedures that would erode the credibility of the data in the eyes of some consumers An access feature is implemented in FIG. 4 that provides easy access for intended users at 160. For example, a URL for accessing the survey is chosen especially to be easy to remember and say even for users with few computer skills. As one example, Ford.SurveysForBusiness.com may be used for employees at Ford. Specifically, no characters with rare or potentially confusing names ("/" or "\" or "~") are required. Also, another access feature is implemented that provides exclusion of access for unwelcome users at 162. Specifically, the assessment form (survey) is password protected on a company-wide basis so that non-employees will be unlikely to enter. As it is with the URL name, the password and user's name are easy for employees to remember, and easy to convey by telephone. Although not protected at the C3 level typical of military servers, the application is designed to run on a server with good security.

A presentation feature is also implemented that provides fool-proof screen resizing with a decorative border 164. Content of the screen automatically resizes to fit the size of the user's window, so that content is easy to view even for users who have few computer skills. A blue border, for example, fills in the remainder of the screen when the aspect ratio of content and window differ. This feature can be easily implemented, for example, with recent versions of the Flash programming language.

Figure 5:
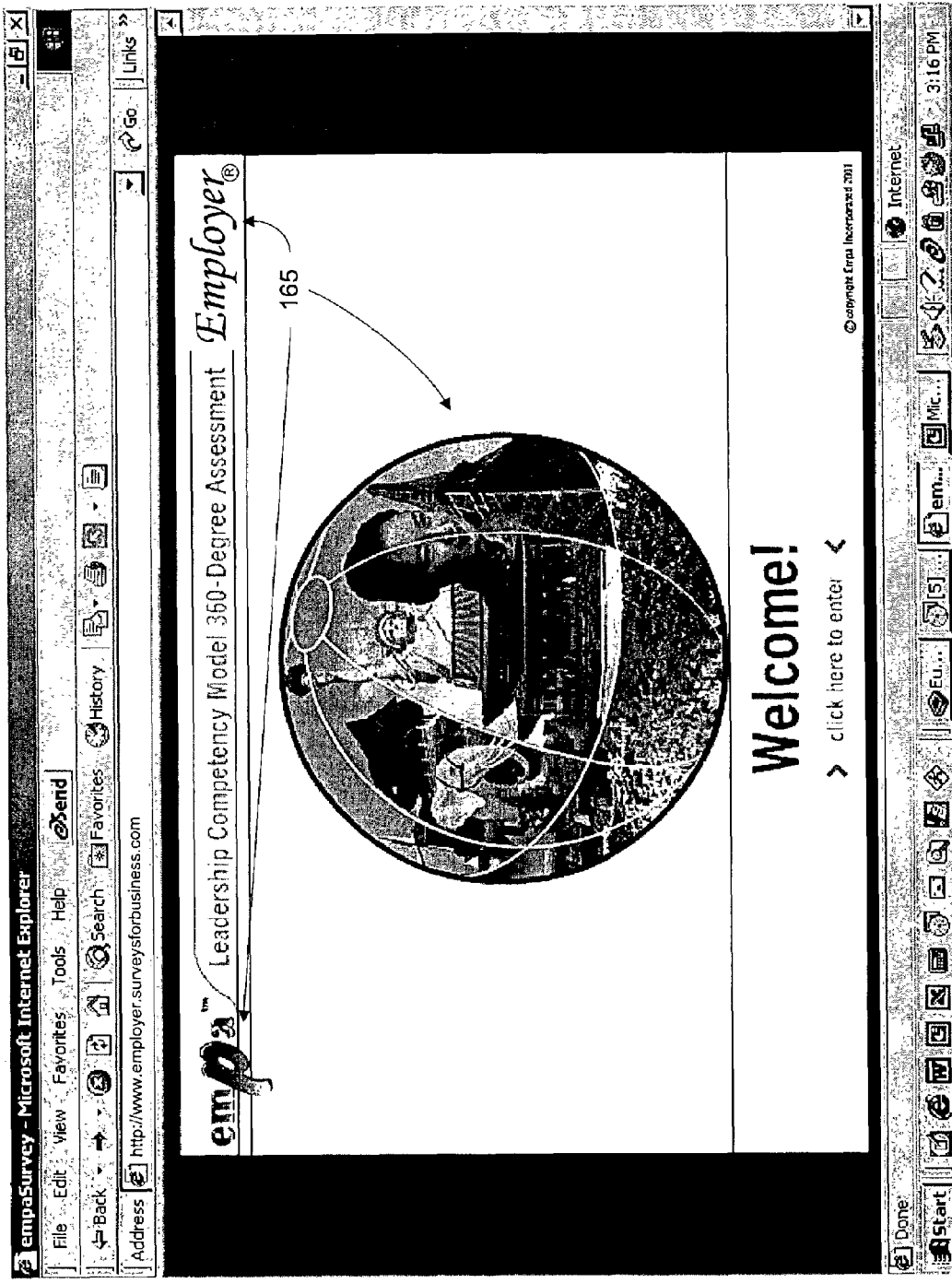

An information feature is further in FIG. 5 implemented in FIG. 5 that provides for demonstration of inter-company cooperation at 165. A welcome screen retains major visual elements of the consulting company (EMPA), such as a logo and a photograph of international landmarks, but adds a logo of the employee's company (Employer, in our example), thereby highlighting the fact that the website is a joint effort of the two companies, owned by EMPA but sanctioned by the employee's company. This issue is important because if the website appears to be owned and maintained by the respondent's company, some employees may be reluctant to participate or to provide candid answers on sensitive questions. Thus, this feature serves to clarify a relationship between the employer and the consulting company.

Figure 6:
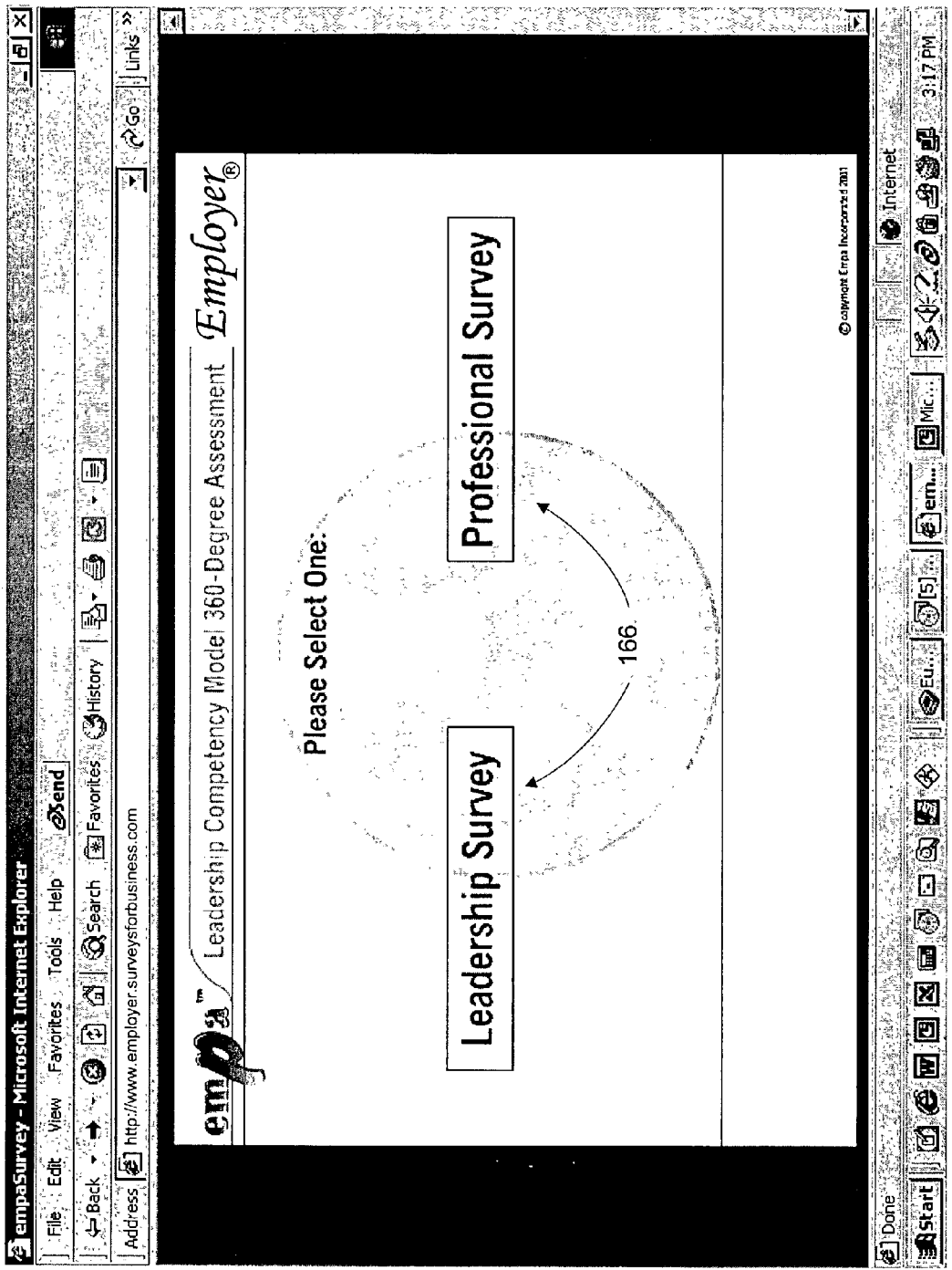

Another access feature is implemented in FIG. 6, in the form of a multi-test selection capability at 166. A test-selection screen allows one company to have several different assessments running simultaneously. The screen also allows tests to be added or removed without sending employees a notification about a new URL, password, or testing procedure.

Figure 7:
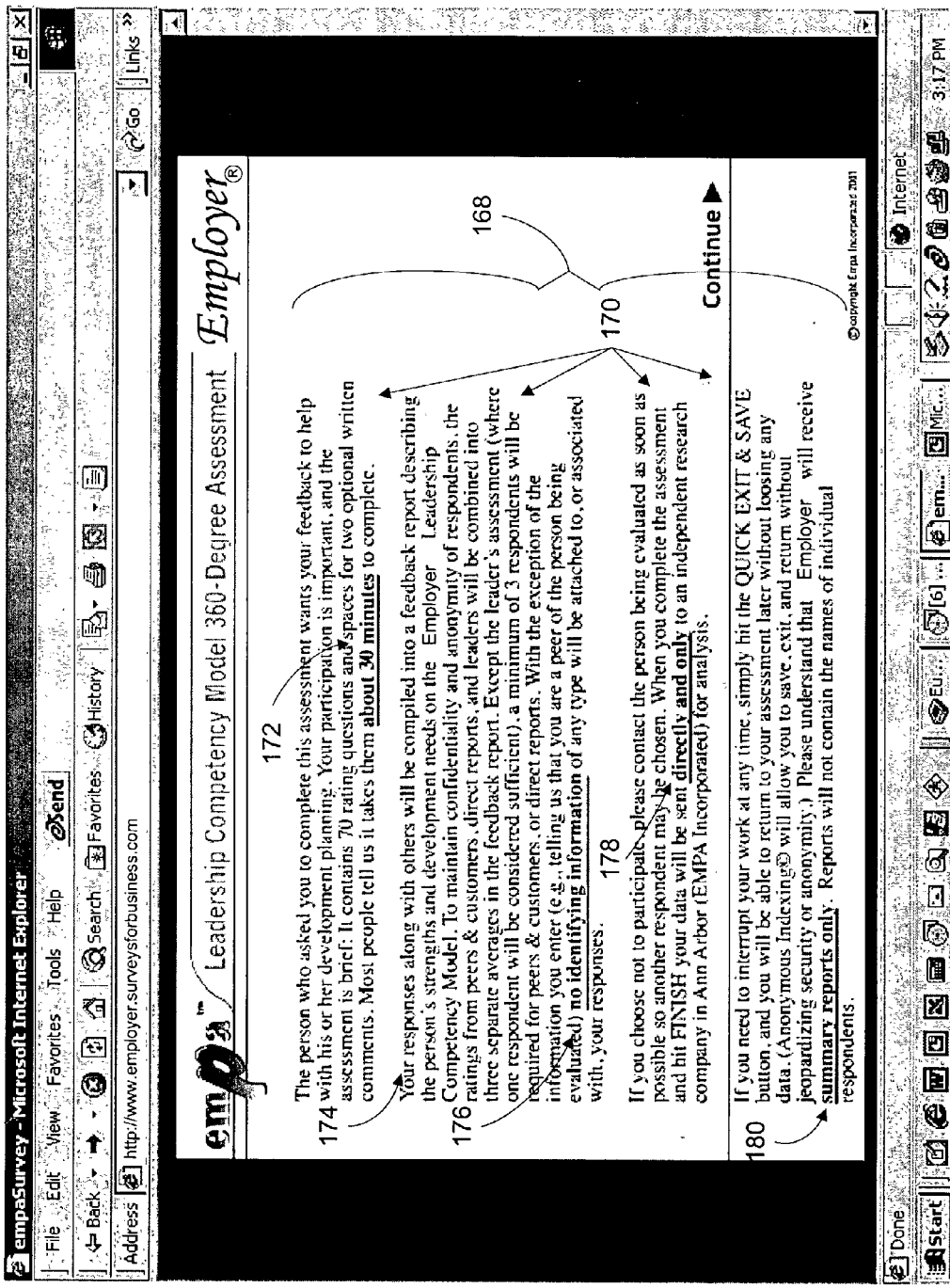

Another presentation feature is implemented in FIG. 7 in the form of skim-proof instructions. Color highlighting on one key phrase in each paragraph of the instructions assures that readers who skim will get the same message as respondents who read the instructions carefully. An additional presentation feature is implemented in the form of easy to read instructions suited to a Cathode Ray Tube (CRT) screen or other active display. Instructions are broken into four short paragraphs, each with one brief main point. This issue is important because readers have diminished ability to track from line to line when reading from a screen, perhaps because of fewer physical landmarks such as hands on a physical page.

Another information feature is implemented that provides for time forecasting at 172. Thus, instructions contain a precise count of the number of questions in the assessment, and the approximate completion time, so that respondents will be less likely to rush toward the test's end, or to abort the test. This issue is important because much research shows that electronic versions of tests garner lower response rates and higher proportions of blank answers than paper-based equivalents, arguably because time forecasting is easy for respondents to perform on most paper assessments by virtue of being able to scan the entire survey before deciding whether or not to participate, a step that is impossible on most electronic surveys.

Another information feature is implemented that provides for explicit justification for collection of demographic data at 174. Instructions inform respondents that the reason for requesting demographic information (on their job or department) is to aggregate responses, not to identify individual respondents. This issue is important because many respondents fear loss of confidentiality and anonymity, an especially salient problem on computer-based assessments in the workplace.

Another information feature is implemented that provides for explicit assurance of anonymity at 176. Instructions tell respondents that, with the exception of the information they enter, such as listing their relation to the evaluee on appraisals such as performance evaluations filled-out by the evaluee's peers, customers, and supervisors, the computer program collects no identifying information of any type about the respondent's identity. This issue is important to users who are computer literate, because the instructions clarify the fact that the website does not use persistent cookies or IP addresses to gather identifying information about respondents.

Another information feature is implemented that provides for explicit assurance of exclusive processing at 178. The instructions tell respondents that their data go directly and exclusively to an outside company for analysis. The issue is important because computer users generally know that email can easily be forwarded to unknown recipients, a situation that could otherwise jeopardize response rates.

Another information feature is implemented that provides for explicit assurance of aggregation at 180. Instructions tell the respondent that his or her individual data record will not be provided to their employer. By generating aggregated summary reports, and by refusing to release the full dataset to the respondent's company, participants gain confidence that their confidentiality will be protected. This issue is important for retaining high response rates.

The aforementioned information features are supplemented by communicating to the employer the name of a contact person at the consulting company, along with that person's, address, and telephone number, so that employees will know whom to contact if questions arise. With this information the consulting company, not the employee's company, becomes the primary point of contact during the data collection process. If and when employees contact the consulting company questioning whether it is independent from the employer, the nature of the relationship between the employer and the consulting company providing the survey is further clarified. Also, if and when employees contact the consulting company questioning whether responses will be confidential and anonymous, the employees are further informed of security procedures taken on their behalf.

Figure 8:
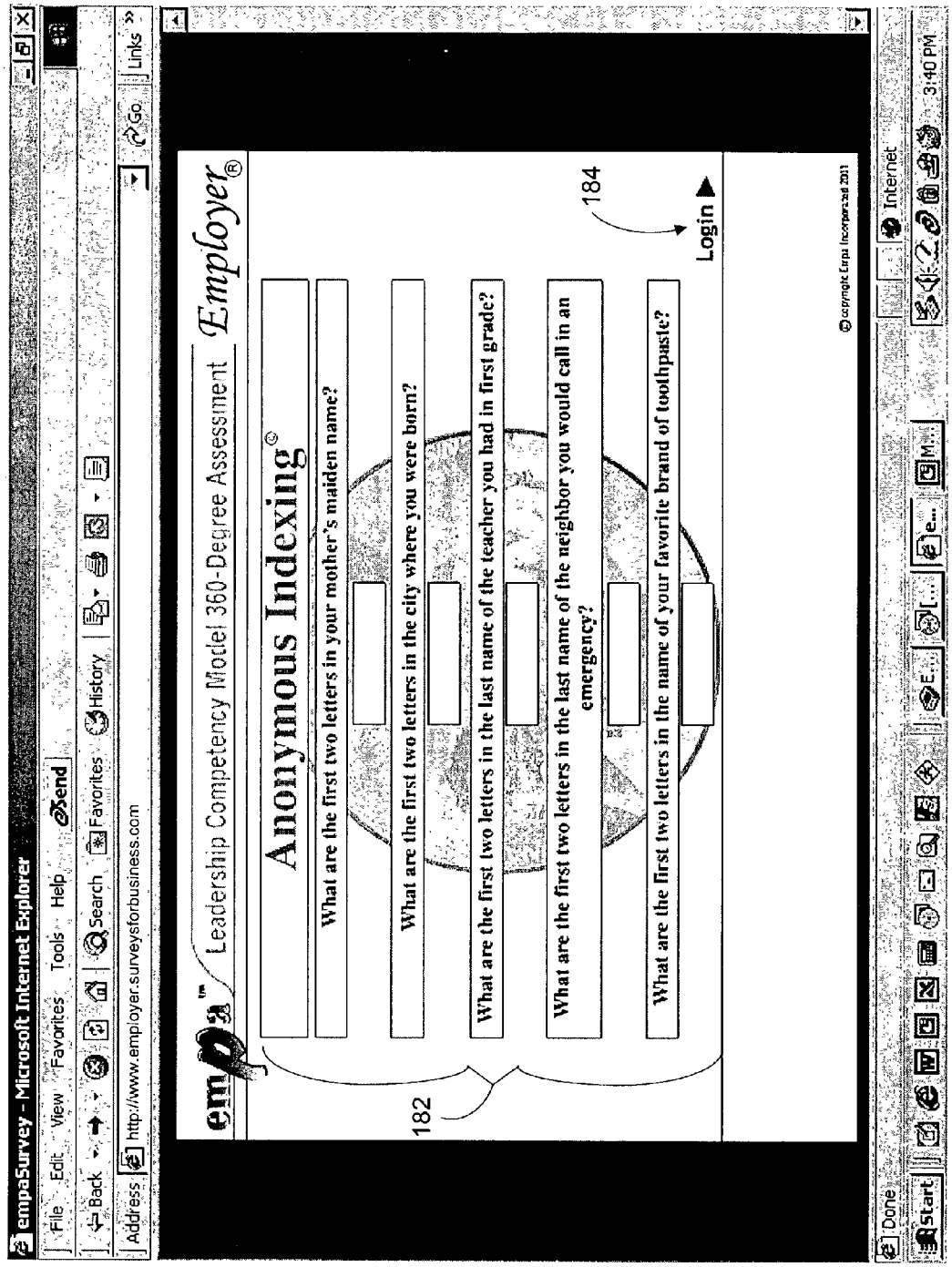

Another access feature is implemented in FIG. 8 that provides for user-generated passwords that require no memorization at 182. Anonymous Indexing© allows users to generate their own passwords that can be reconstructed at will without relying on memorization or a written document. Passwords are a 10-letter string created by a series of five questions that each respondent presumably answers differently. The procedure generates more than 140 trillion unique passwords per company (exact number is 141,167,095,653, 376—i.e., $26^{10}$).

Another access feature is implemented that provides for recovery capability for interrupted sessions at 184. The interface is written so that it uses the respondent's unique password to identify and reconstruct ratings after an unexpected interruption in the session. The feature is important because otherwise response rate would suffer when interruptions induced respondents to log-off as they responded to an urgent work issue.

Another access feature is implemented that provides a safeguard for coincidental matches of passwords (not shown). If two respondents with identical passwords simultaneously use the recovery feature described directly above, a safeguard is written into the code so that confidentiality can be protected. Unlike all other ratings and demographic information, the recovery feature erases response data in the field that identifies the respondent. Specifically, on 360-Degree performance evaluations the software erases data showing the respondent's relation to the evaluee. On employee surveys it erases the respondent's job code. The issue is important because if two respondents had matching passwords, and if they both had interrupted their sessions contemporaneously, one user might otherwise see a survey partially filled out by a coworker whose identity might be guessed from the identifying information.

Figure 9:
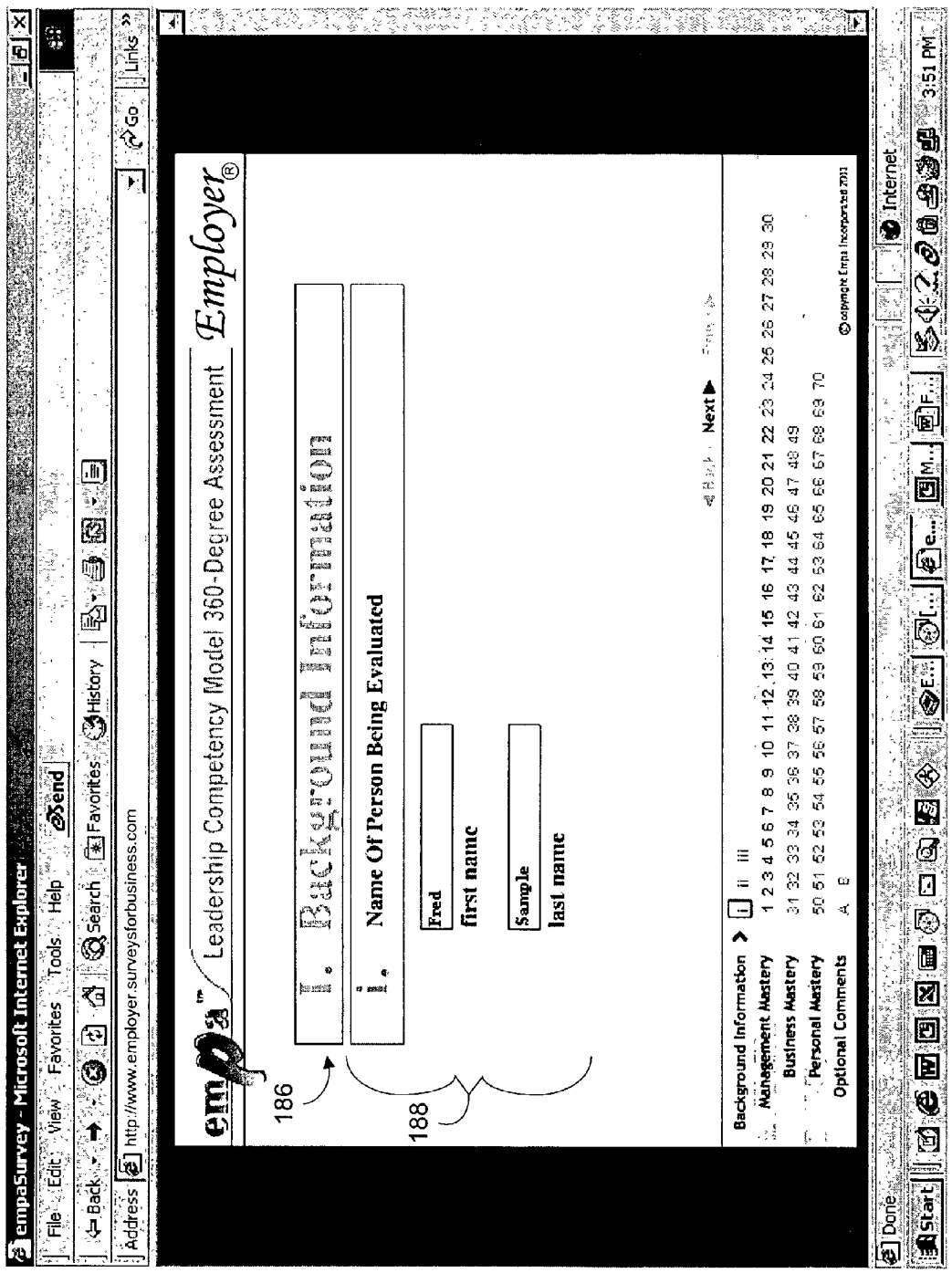

Another presentation feature is implemented in FIG. 9 that provides for a section identifier 186. In low-contrast text, respondents see the name of the section that they are currently working in. This issue is important because low-contrast text minimizes the salience of the information, so that the label will help respondents keep their place, but will be unlikely to induce a strong response bias whereby they simply enter a single rating for all questions in an entire section.

Another presentation feature is implemented that provides for sparse screen content on each question at 188. In general, each screen contains only one question, so that respondents get the benefits of large font size, little clutter, and quick navigation capability. This issue is important because respondents are more likely to complete an automatic electronic survey when content is presented in a way that facilitates communication and access.

Figure 10:
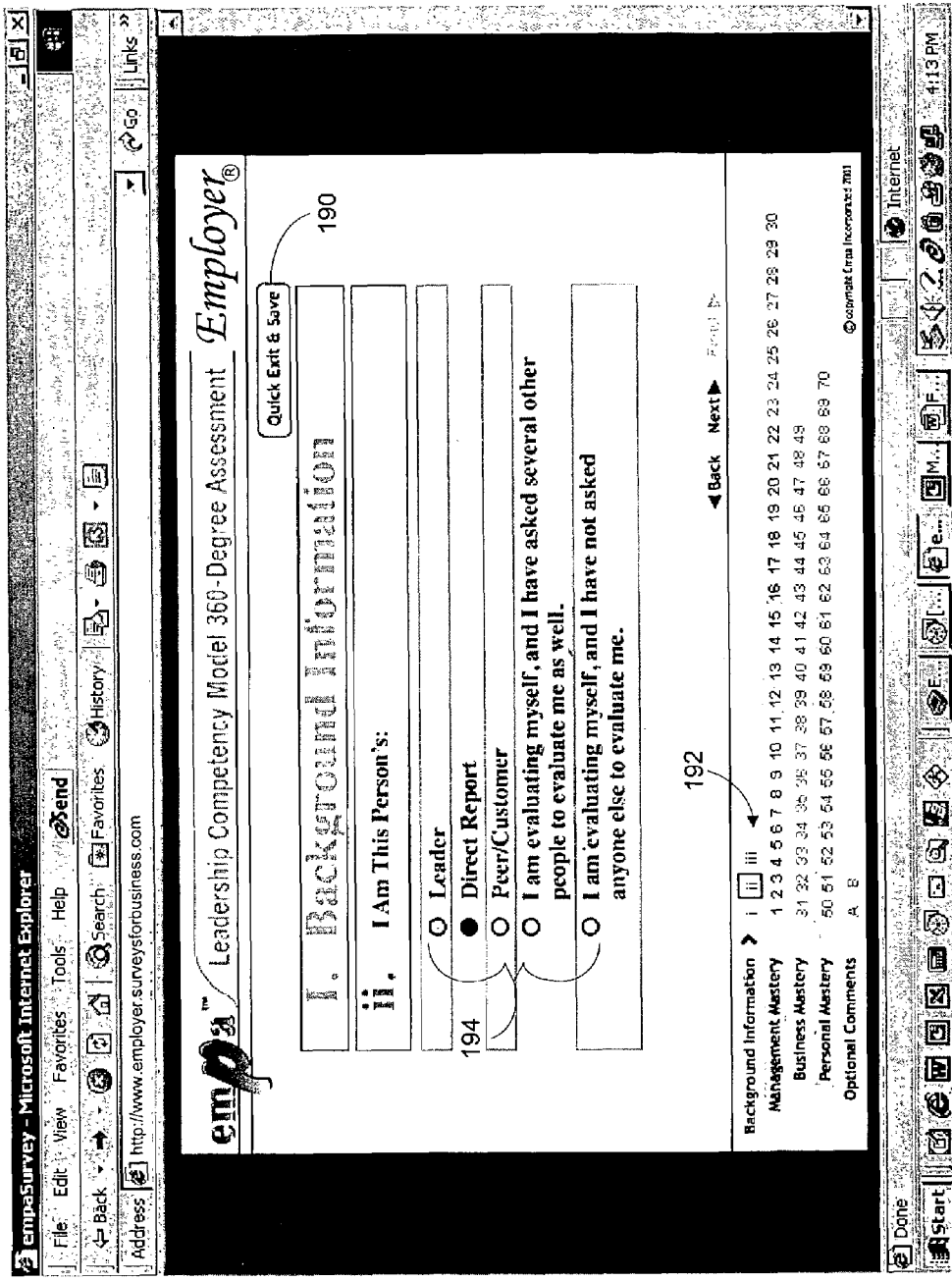

Another access feature is implemented in FIG. 10 that provides a quick exit and save button 190. A single button allows respondents to save their work and exit to a nearly blank screen that shows no rating information. This issue is important because respondents who fill out assessments in the workplace must be able to recover easily from interruptions, and need to do so in a manner that allows them to instantly remove confidential information from their screen.

A final information feature is implemented that provides an isometric progress indicator at 192. A graphic visual display shows respondents exactly how many questions they have completed and how many remain. The indicator is designed to be isometric with the proportion of the test completed, so that users can, at a glance, know their precise place in the test relative to its start and its end.

Another presentation feature is implemented that provides for color-coded buttons showing one of three states at 194. Un-selected response buttons appear gray, while buttons that are about to be selected by a mouse-click because the cursor is nearby appear turquoise. Buttons that have been selected by the user's mouse-click appear as navy. These colors are selected because none of the color differentiation is lost or distorted by problems associated with poorly adjusted color monitors or color-blindness.

Figure 11:
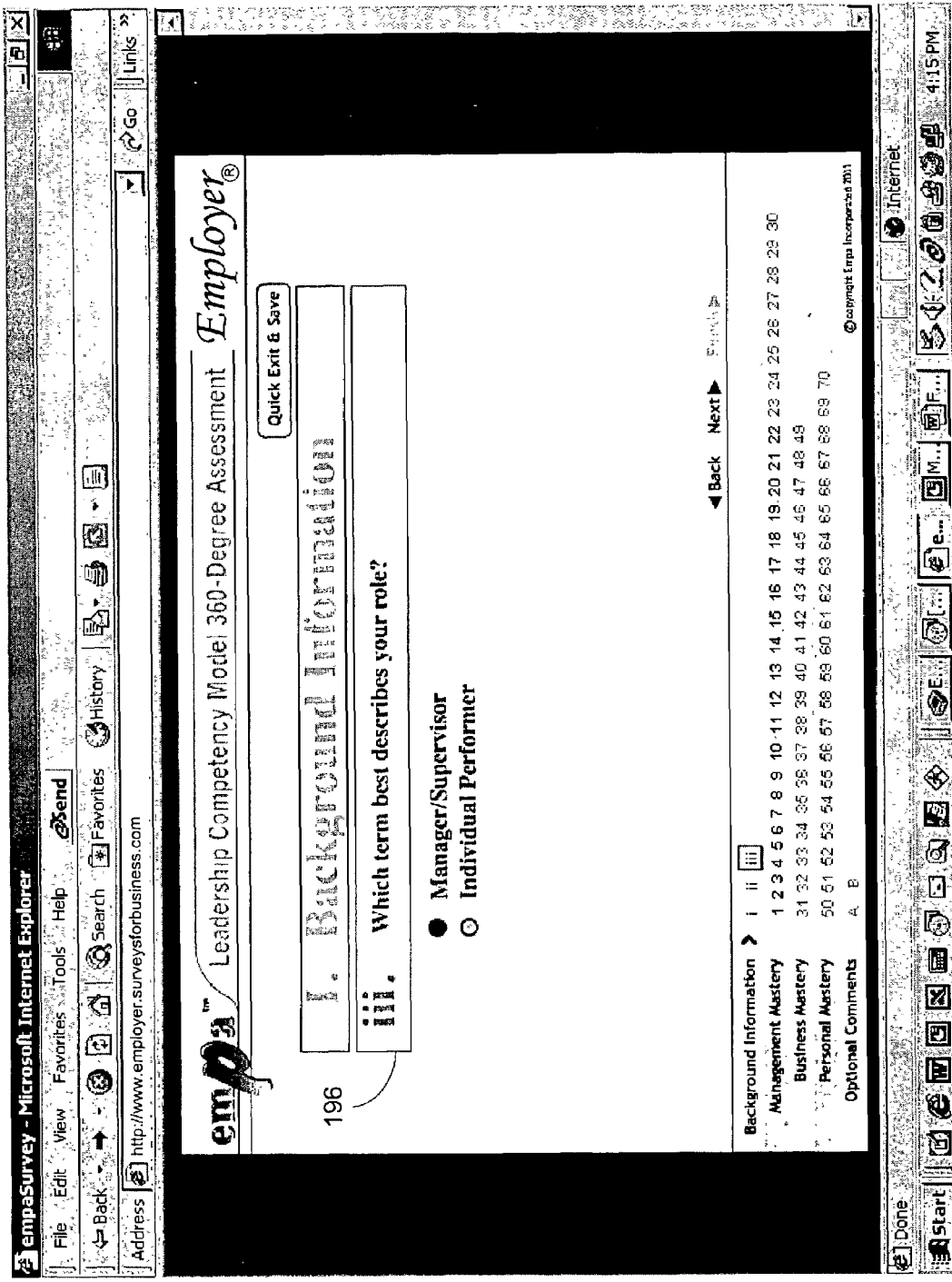

Another presentation feature is implemented in FIG. 11 that provides for task-dependent placement of demographics at 196. On 360-Degree performance assessments, demographic questions, such as identifying the name of the evaluee or the respondent's relation to the evaluee, are placed at the beginning of the assessment to highlight the fact that their completion is required before proceeding further. On employee surveys the demographics are placed at the end of the questionnaire to highlight the fact that their completion is optional. This issue is important because demographics rarely depress response rates for 360-Degree assessments, but they can dramatically lower response rates on employee surveys. The specified placement maximizes utility and minimizes likelihood of a negative impact on response rate.

Figure 12:
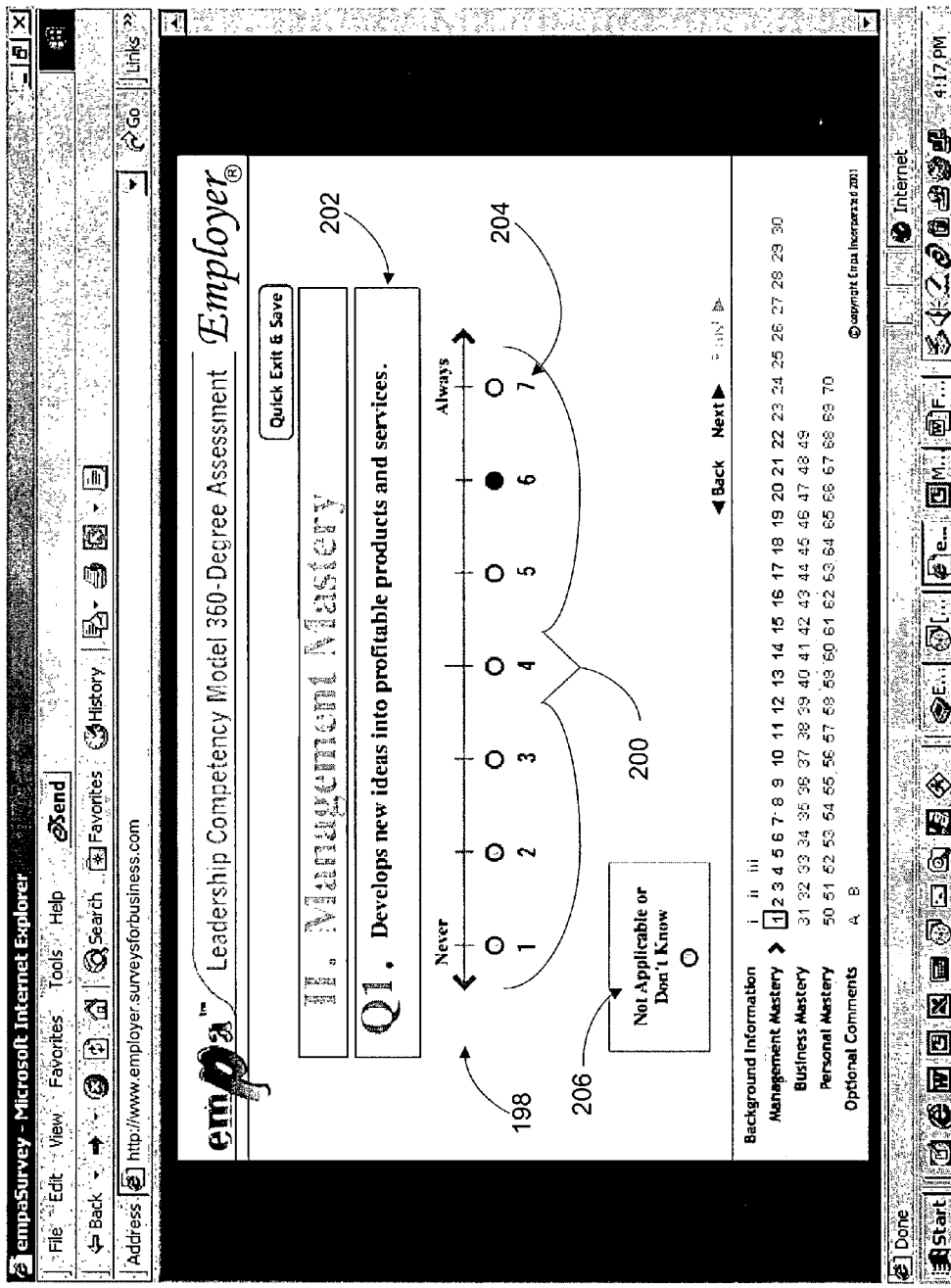

A content feature is still further implemented in FIG. 12 that provides a rating scale based on estimated frequency at 198. The rating scale asks respondents to provide estimated frequencies of directly observable events, with NEVER at one pole, and ALWAYS at the other. This issue is important because research shows that estimated frequencies garnered from well-worded questions are more reliable and more accurate than alternatives commonly used in workplace assessments.

Another content feature is implemented that provides for a rating scale that generates ratio data at 200. The rating scale has only the two extreme poles (NEVER and ALWAYS) labeled. Resulting data are technically designated as ratio scale data, where there is an absolute zero point, and each value on the rating scale's underlying continuum is equidistant from neighboring values. To lessen the burden on respondents and to continually remind them of the continuum underlying the ratio scale, a number (1, 2, 3, etc.) accompanies each response alternative. This issue is important because ratio scale data are more conducive to rigorous statistical analysis than ordinal data (where response options are merely different because of their order) or nominal data (where response options are merely different because they are named entities).

Another content feature is implemented that provides for questions designed to generate normal distributions at 202. Because the response scale goes from NEVER to ALWAYS, it is possible to craft questions that generate a normal bell-shaped curve. The issue is important because research shows that variables with normal distributions generate more stable and informative data in multivariate statistical analyses.

Another content feature is implemented that provides for a rating scale having an odd number of alternatives at 204. The rating scale has an odd number of alternatives, so that respondents can provide a neutral answer (one that is neither positive nor negative) if they choose to do so. This issue is important for maintaining a low number of blank responses.

Another content feature is implemented that provides for a rating scale having a "Don't Know/Not Applicable" (DK/NA) option at 206. The rating scale provides respondents with the ability to select DK/NA so that they are not constrained to provide answers that they do not fully endorse. This issue is important because research shows that having a DK/NA option is conducive to a good response rate and enhanced validity. Moreover, placement of the DK/NA option is specifically selected to minimize its prominence by locating it in a corner of the screen that is scanned less frequently (by virtue of the fact that English text is read from left to right) so that respondents will be less likely to select this uninformative response simply as a means for avoiding the effort required by a quantitative rating.

Figure 13:
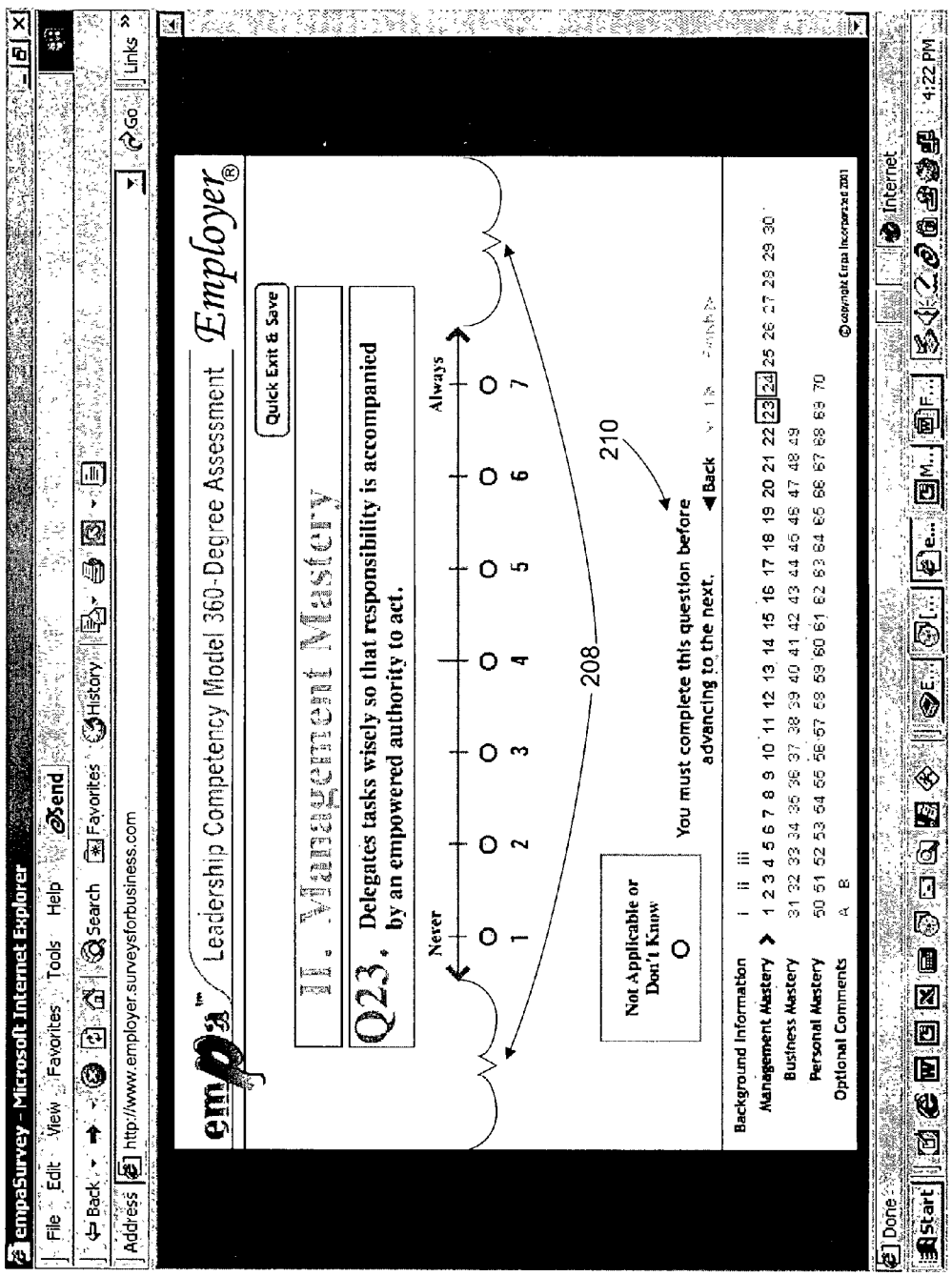

A final presentation feature is implemented in FIG. 13 that provides for visual symmetry of the response scale and the screen at 208. The application is designed so that, regardless of the user's local settings on his or her computer, the response scale will appear in the center of the content window with no visual elements to disrupt the user's full scanning of the scale's entire length. This issue is important because research shows that place biases can exist if the response scale is not centered.

Another access feature is implemented that enforces lockout for an omitted response at 210. The application requires the respondent to make a response before advancing to the next question. This ability is an advantage that paper-and-pencil assessments cannot provide, and helps to ensure that respondents do not accidentally or intentionally skip questions.

Figure 14:
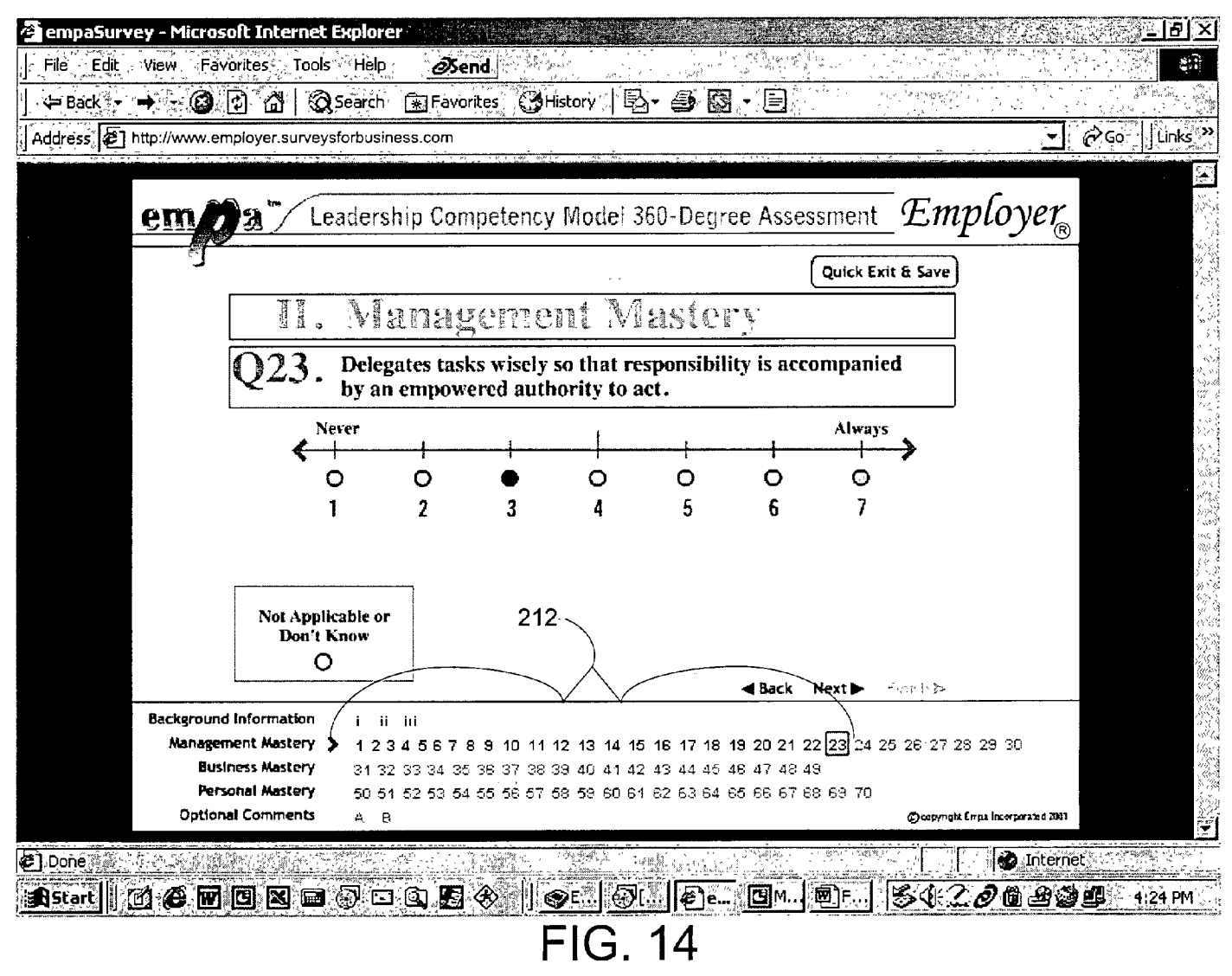

Another access feature is implemented in FIG. 14 that provides for full navigation and revision capability of completed items at 212. The progress indicator has a built in go-to feature that allows the respondent to go to any previously completed item and review or revise the response. A go-back button also allows the respondent to go backward one question at a time. The same navigation ability exists for any question already completed, so that (until the "FINISH" button is hit to submit the data) respondents can navigate forward or backward to any question that has been answered.

Another access feature is implemented that enforces keyboard exclusion to discourage automatic responses (not shown). The numeric keypad and the numeric keys of the keyboard are disabled so that respondents are not able to continually hit one key for every question. However, the Return/Enter key of the keyboard is active to enhance ease of use, and can be used in place of hitting the "Next" button after the completion of each question.

Figure 15:
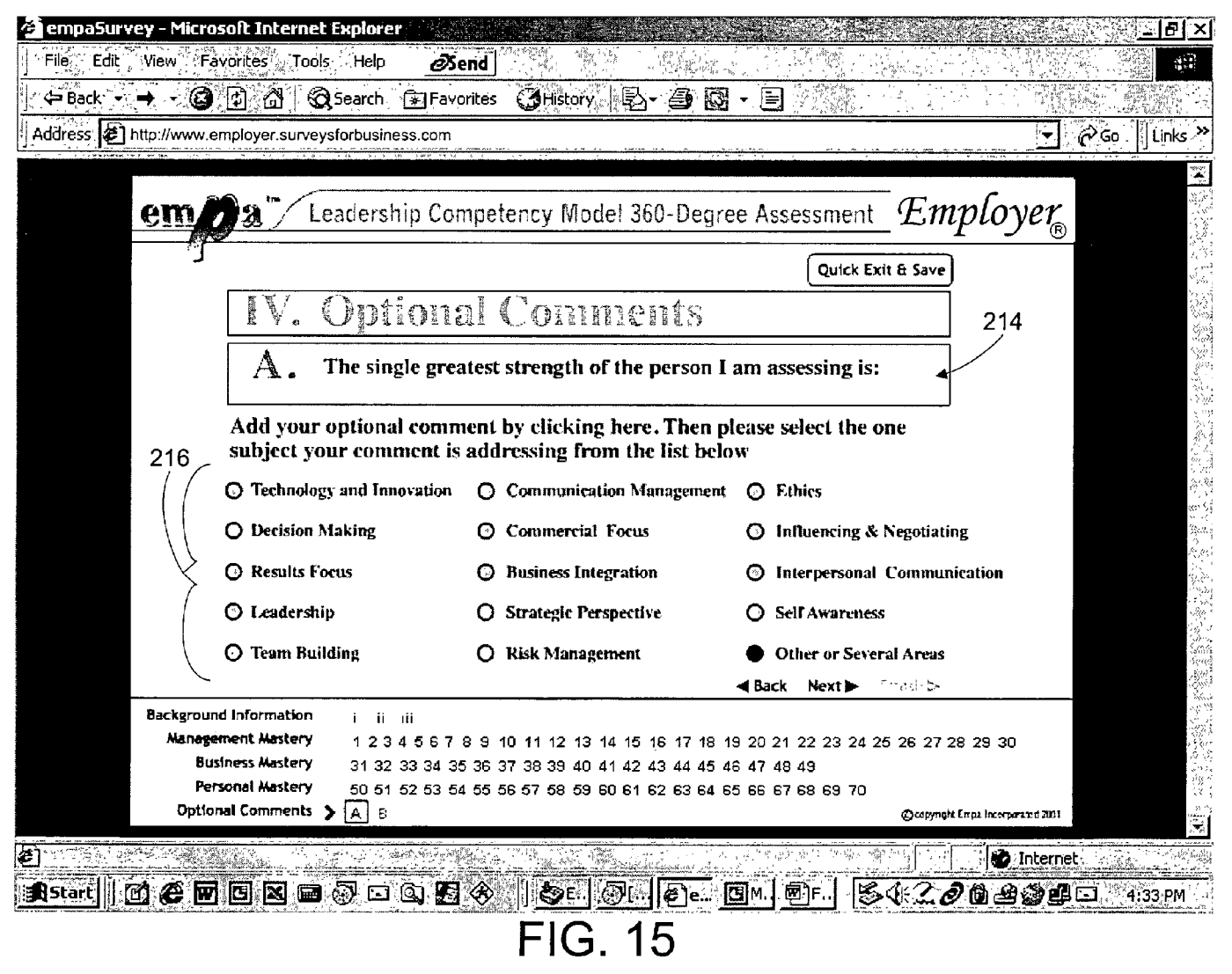

Another content feature is implemented in FIG. 15 that provides bivalent optional comment fields at 214. Comments are explicitly marked as optional, and ask first for a positive comment, then a negative comment. The bivalent probe allows respondents to avoid appearing as if they only have bad things to say—an important feature in most corporate cultures.

Another content feature is implemented that provides for user-defined topic indicators for the optional comments at 216. The interface requires respondents to assign a topic to their comments, so that this important classification task can be handled without external intervention. The choices for a topic are determined by the topic areas covered in the assessment, with one additional option ("Other, or Several Areas") available to cover exceptional comments.

A final content feature is implemented that provides for equivalent probes for positive and negative comments. Probes for optional written comments ask the respondent to describe the single best (or worst) feature of the evaluee (or department where they work.) The probes have the important ability to allow numerical comparisons between negative and positive comments because we explicitly ask for the one superlative positive and the one superlative negative feature of the thing being evaluated. The feature is important because it allows us to build a self-contained validity check for the assessment: Within each topic area, if the questions are well chosen and validly answered, we should see a correlation between quantitative ratings and tabulated numbers of qualitative comments.

Figure 16:
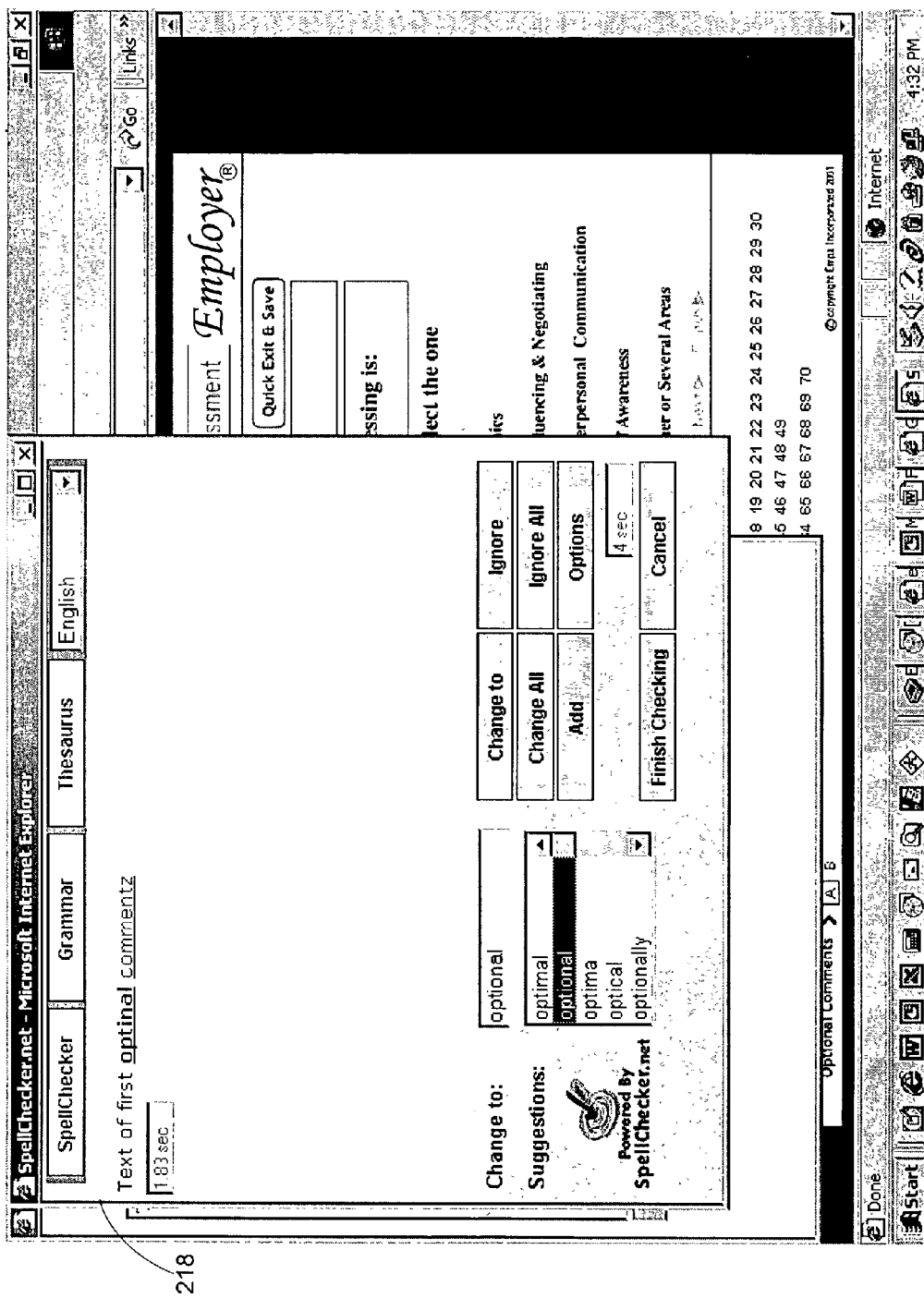

Another access feature is implemented in FIG. 16 that provides an automated spell-checker for comments at 218. A spell-checker allows respondents to protect their identity in those cases where he or she is famously associated with poor spelling or unique misspellings. This feature thus increases accessibility of the optional comments for these individuals.

Figure 17:
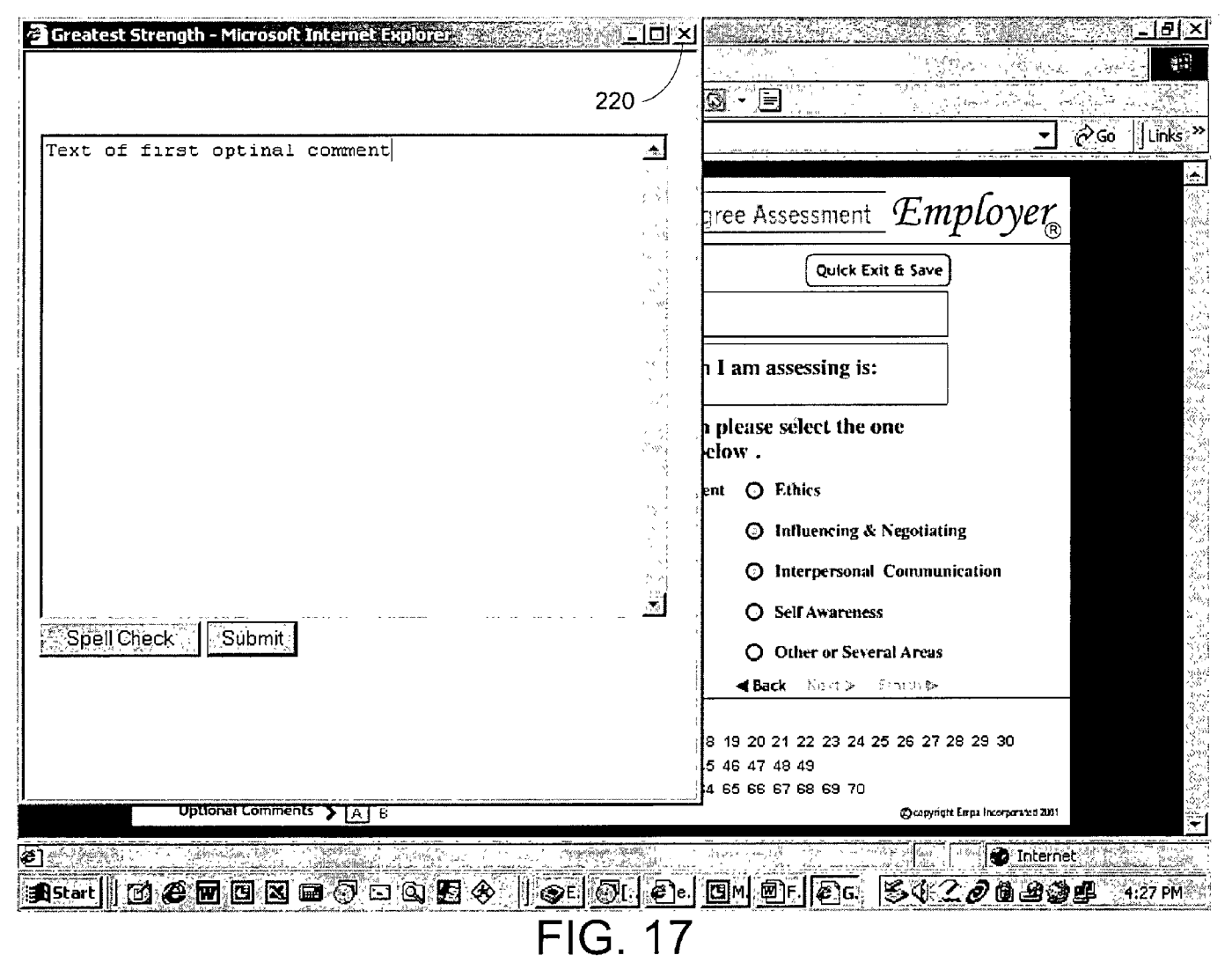

Another access feature is implemented in FIG. 17 that provides quit-box capability for comments at 220. Comments are set up in a separate window on the respondent's screen. This set up allows the respondent to cancel his or her comment easily, by clicking on the "X" icon in the window's quit-box, a mouse-click command that is common on virtually all personal computers. This feature is important because few respondents plan such comments carefully, and some find that, after a moment's reflection, they prefer to withdraw their comment, and accordingly need a simple means for doing so.

Figure 18:
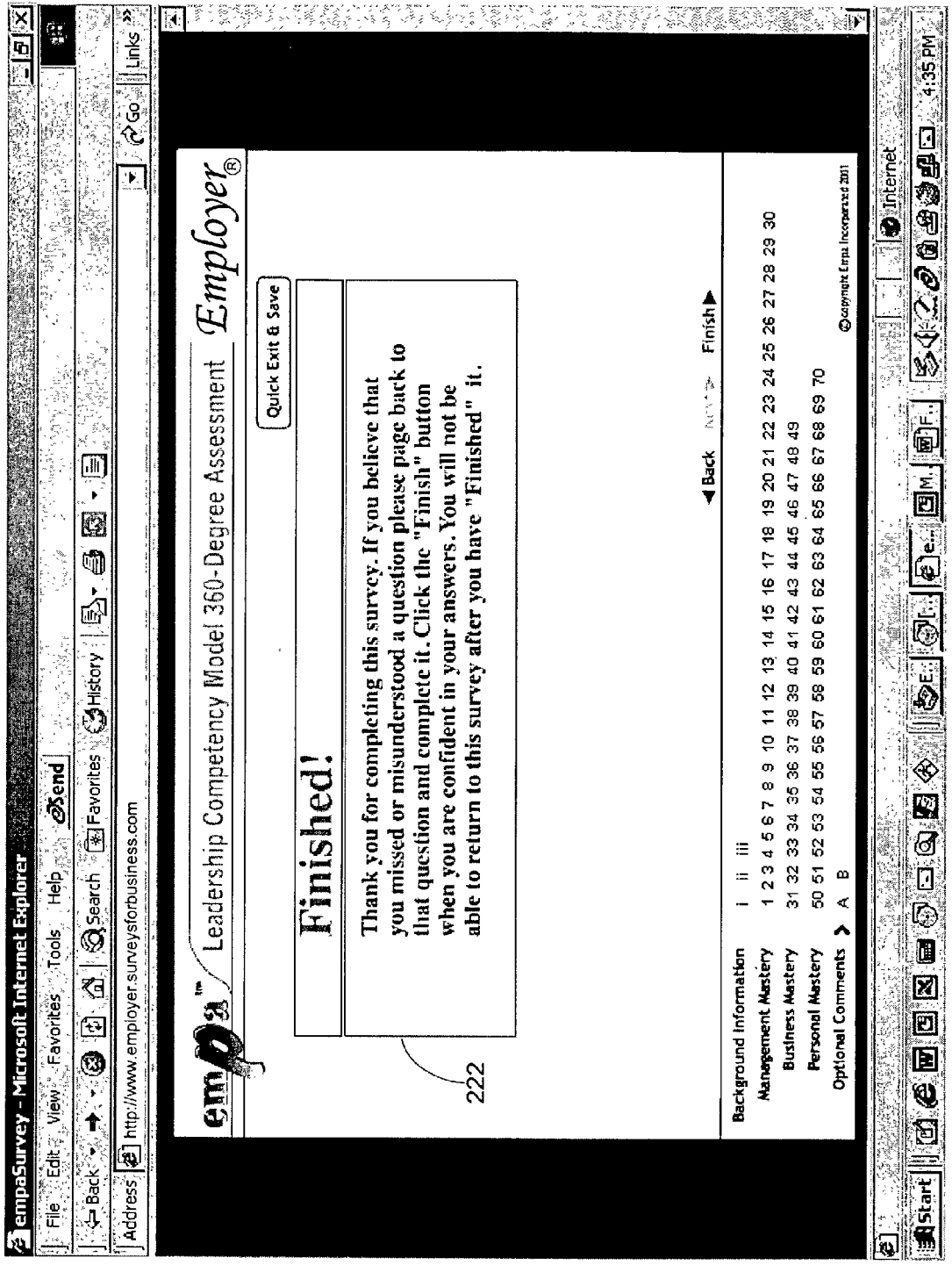

Another access feature is implemented in FIG. 18 that provides a finish screen that allows revision or cancellation at 222. This screen gives respondents a final opportunity to review or revise their responses before they are submitted. This screen also allows respondents to either cancel their data completely (by clicking on the "X" icon in the window's quit-box) so that their data are never submitted, or to use the Quick Exit & Save button, so that they can return to their assessment at a later time and review all their responses prior to submission.

Figure 19:
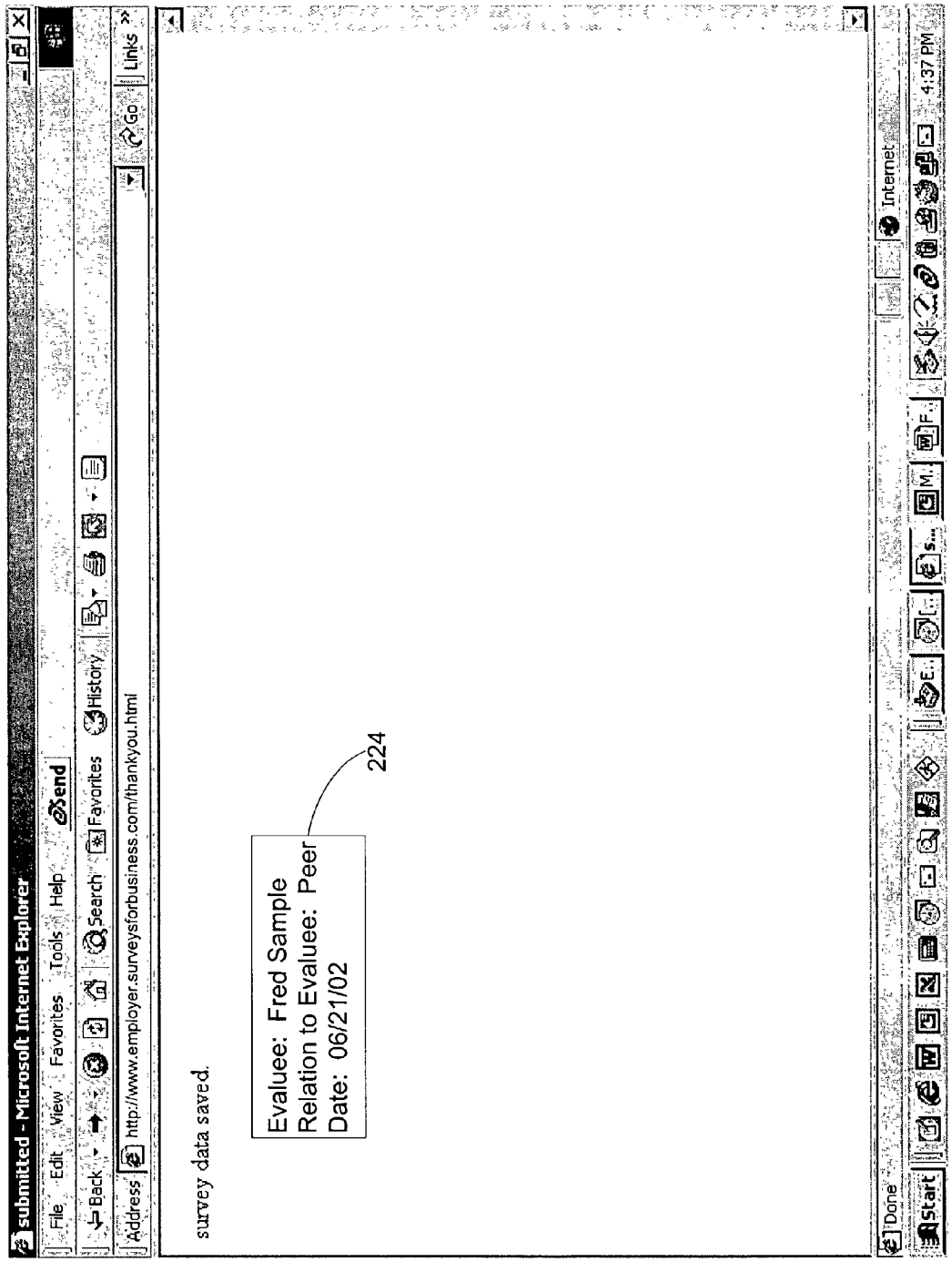

A final access feature is implemented in FIG. 19 that provides a confirmation screen at 224. The application generates a final confirmation screen after respondents hit the "Finish" button so that they receive an easily printed confirmation of their submission, the date, the name of the evaluee, and their relation to that evaluee. This issue is important because, in typical organizations, employees are asked to submit assessments for several different evaluees. Printed confirmation sheets lower the likelihood of neglected or duplicated evaluations, thus matching the unique nature of hard-copy, mail-distributed surveys, while preserving respondent anonymity.

It should be readily understood that the above described features of an automated electronic survey may in some cases be implemented with a paper and pencil survey, while others particularly assist in causing a corresponding automated electronic survey to function to obtain substantially similar data as that of the paper and pencil survey. For example, many of the information features, such as skim-proof instructions, content features, such as frequency-based questions and rating scales, and presentation features, such as centering a rating scale in a reference frame (page or screen) can be equivalently applied in paper-and-pencil surveys and automated electronic surveys. Further, many of the access features, such as URL and password selection and/or generation, presentation features, such as automatic screen resizing and one question per screen, and information features, such as automatic progress indication, are specific to an automated electronic survey implementation as opposed to a paper-and-pencil survey. The automated electronic survey according to the present invention, thus possesses features desirable in a paper-and-pencil survey with addition of features that assist a respondent in accessing, perceiving, and completing the survey without response biases that typically result from an automated electronic implementation occurring, for example, with Web-based distribution.

The present invention makes use of automated filters to monitor respondent behavior during survey administration to increase the validity of data. In general, these filters operate together by tracking time between responses, comparing standard deviations of responses, looking for contradictory responses, and looking for too many extreme responses. Potentially invalid responses and their associated questions are then presented to the respondent for review and/or alteration, along with explanations for why these specific responses have been flagged. It should be readily understood that in many cases the responses can be filtered, for example, after the respondent hits the submit button, or after the respondent completes a predetermined number of individual questions.

Figure 20:
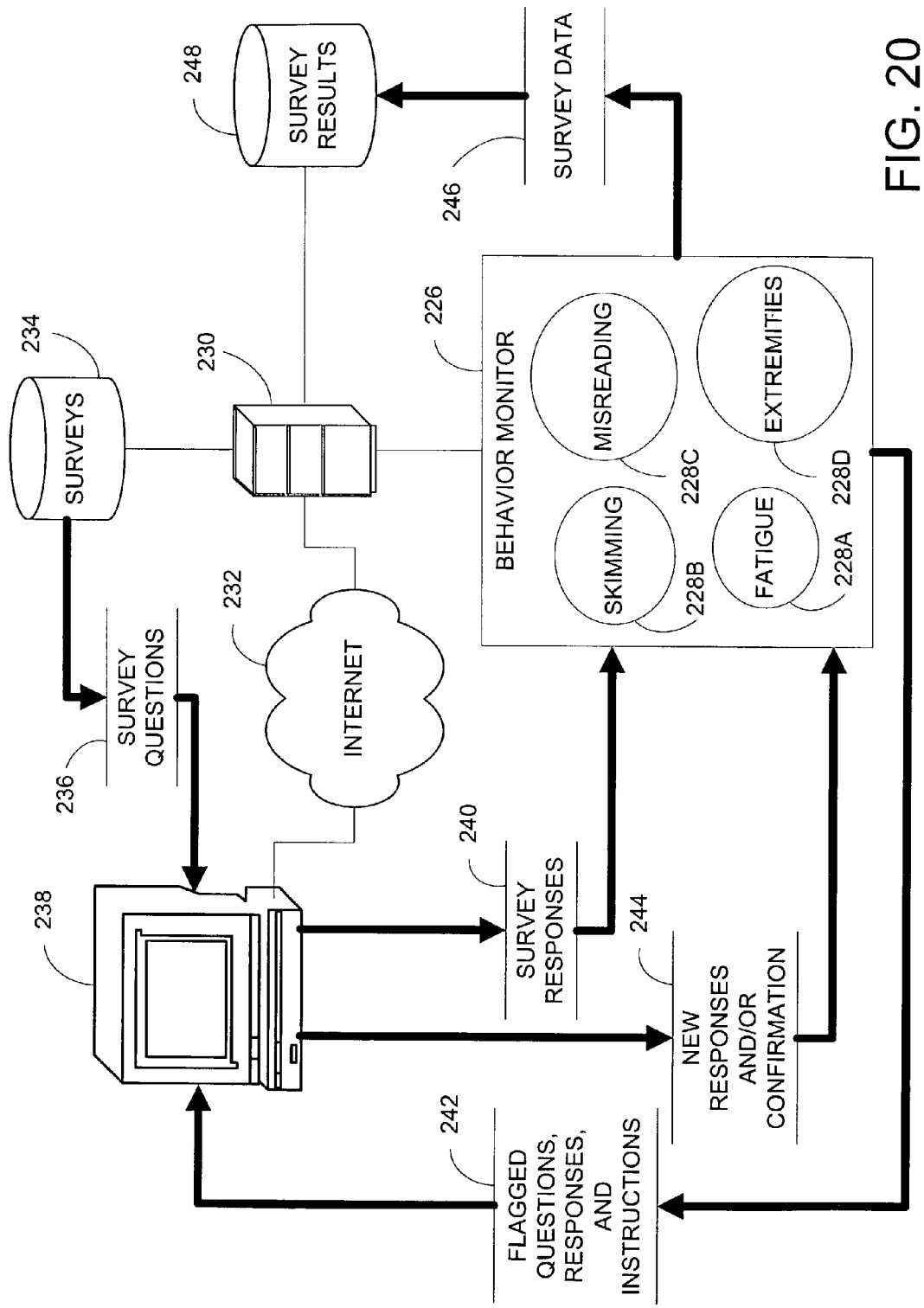
FIG. 20 is a block diagram depicting automated electronic survey administration according to the present invention.

FIG. 20 demonstrates survey administration using a behavior monitor that employs various filters 228A-D according to the present invention. These filters generally correspond to detectors combined with a review and edit function. A server 230 connected to a publicly accessible computer network 232, such as the Internet, provides a Website administering automated electronic surveys stored in a data store 234. Survey questions 236 are communicated to a client 238 over the network 232, and survey responses 240 are communicated back to server 230 over the network 232. The survey responses are filtered through behavior monitor 226, which uses filters 228A-D to flag potentially invalid responses as described above, and as further described below. The flagged questions, responses, and instructions 242 for reviewing and editing responses, along with explanations for why the responses were flagged, are communicated back to the client 238 over the computer network 232. New responses and/or confirmation of responses 244 are communicated to the behavior monitor 226 over the computer network 232. Survey data 246 are then communicated to a data store 248 for storage and subsequent processing.

It should be readily understood that various alternative implementations are available for employing the behavior monitor 226 and its associated filters 228A-D. For example, survey questions and responses can be exchanged one at a time so that a behavior monitor 226 residing on server 230 can track read-and-response times. Also, the time tracking function can be accomplished on board the client machine so that survey responses 240 are accompanied by time-of-day information in the respondent's time zone at the initiation and completion of the survey, information that would be useful in subsequent analyses. Further, survey responses 240 may be accompanied with a corresponding question or a question identifier, or survey questions 236 may be additionally communicated to behavior monitor 226 in an order that allows them to be matched to responses 240. Still further, the behavior monitor 226 and/or filters 228A-D may alternatively be built into the automated electronic survey, so that they reside on the client 238 machine during survey administration, such that only survey data 246 are communicated back to server 230.

Figure 21:
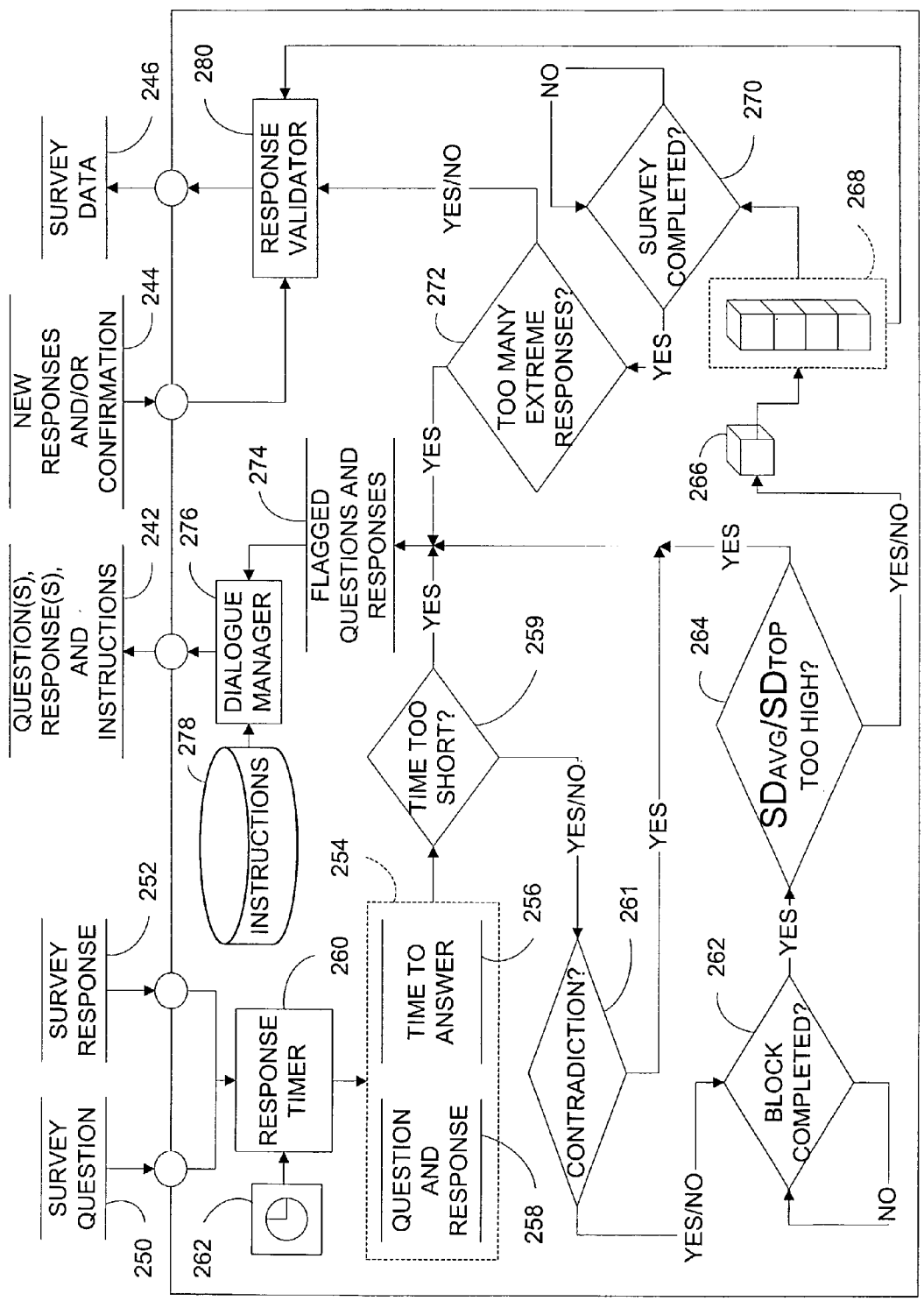
FIG. 21 is a block diagram depicting a behavior monitor employing various filters and/or detectors according to the present invention.

FIG. 21 illustrates a behavior monitor according to the present invention that resides on the server, rather than the client machine. It further receives a survey question 250 and associated survey response 252 contemporaneously so that it can create a response data object 254 by recording a read-and-response time 256 in association with the question and response 258 using a response timer 260 that calculates the time to answer based on a current timing function 262. This implementation is particularly described herein to conveniently demonstrate integrated logic associated with various filters according to the present invention, and not to express a preference for a particular implementation. The preferred embodiment implements recording of read-and-response times and division of questions and responses into blocks and sub-blocks during survey administration, followed by a subsequent analysis of responses as a whole after the respondent activates the submit button. Notably, the term "blocks" is used herein to refer to arbitrary sets of approximately 10 questions necessary for the fatigue filter. It is also used in other contexts, however, to designate the block of all positive questions and the block of all negative questions necessary for the misreading filter. The term "sub-block" is also used to denote the set of negative questions on a single topic, which is compared to the sub-block of positive questions on that same topic.

In describing the behavior monitor 226 of FIG. 20 and associated filters according to the present invention, it should be readily understood that the following applications are described in a context of the presently preferred embodiment. For example, the presently preferred embodiment generally uses a 1-to-7 response scale going respectively from "Never" to "Always", and each assessment contains roughly 70 questions or less. Also, approximately two-thirds of those questions are worded positively so that a high rating, (at or close to 7/Always) indicates the desired state, and approximately one-third are worded negatively so that a low rating, (at or close to 1/Never) indicates the desired state. Further, the total number of questions is typically an even number, so that questions can be easily divided into blocks of approximately equal size useful for statistical analysis as further described below.

A first filter according to the present invention, shown at 228 of FIG. 20, corresponds to a test fatigue detector. This filter computes the standard deviation (SD) of the ratings in 10-question blocks. For example, in a 70-question assessment, there would be 7 blocks of 10 questions, and the SD within each block would be computed. If the average SD in all the previous blocks divided by the SD of the subsequent block is equal to or larger than 2.0, then a flag is raised for that block. According to the example of 7 blocks from a 70-question assessment, the first comparison examines the ratio of the SD in the first block over the SD in the second block. The second comparison examines the ratio of the average SD in the first and second blocks over the SD in the third block. The sixth and final comparison computes the average SD in the first six blocks over the SD in the seventh block. It is important to note that even though this filter computes the SD in a block of questions to see if the range has become constricted in that block, this filter, and all the other filters of the invention, work best if activated after the respondent hits the submit button, but before the data are actually sent to the server.

After the respondent hits the "SUBMIT" button, the software re-displays, all on one screen, the 10 questions (and their ratings) where the ratio of the average SD in the previous blocks divided by the SD in that given block was equal to or greater than 2.0. Above these questions the respondent sees the following message: "Your responses on the 10 questions below activated an automated filter because your ratings became a typically uniform—a pattern we sometimes see when respondents get tired or impatient. Please review your responses, and change them if they don't reflect your true opinion; of course, if they ARE the responses you intended, simply leave them as is, and hit the 'NEXT' button at the bottom of this screen." Notably, it would almost never be the case that more than 10 questions would have to be displayed & reviewed because of the way respondents answer surveys; it would certainly never be necessary to flag more than 20 questions for review, because if SD plummets, it does so only on a small number of questions at the very end of a long survey. Nevertheless, because of the few cases where it will take more than one screen to display these flagged questions and their responses; a "Continued on the NEXT screen" button will be substituted for the conventional "Next" button if needed.

Transformation is involved when the respondent reviews—or reviews and revises—a response while being sensitized to the likelihood of a specific distortion on a specific question. Essentially, this response isolates some of the "noise" associated with a common response bias, allows the respondent to evaluate the likelihood of that response bias on a specific question, and then makes it easy for him or her to correct any inaccuracies that would otherwise distort survey data. It is a transformation that would be too time-consuming to implement in a conventional paper-based questionnaire.

A second filter according to the present invention is a skimming detector at 228B of FIG. 20. This filter computes the average reading and response time for each question—the interval between the keystroke that displays a given question and the keystroke of the respondent hitting the "Next" button that signals his or her completion of that question's response; this filter compares the reading-and-response time of each question to the respondent's average reading and response time for all questions in the survey, and determines whether the reading and response time on any given question is implausibly brief, according to a predetermined criterion. Specifically, if a given question's read and response time is 20% or less of the average read and response time for that respondent on that survey, then, the filter is invoked and the following message appears: "Your responses on the questions below activated an automated filter because your ratings became a typically fast—a pattern we sometimes see when respondents begin to rush. Please review your responses, and change them if they don't reflect your true opinion; of course, if they ARE the responses you intended, simply leave them as is, and hit the 'NEXT' button at the bottom of this screen." As before, transformation is involved when the respondent reviews—and in some cases revises—a response so that it comes closer to matching his or her true opinion.

A third filter according to the present invention is a misreading detector. This filter computes the average rating of each positively worded question in each topic, and compares it to the transposed rating of each negatively worded question in that same topic. Transposition in this case simply changes a score of 1 to a score of 7, a score of 2 to a score of 6, and a score of 3 to a score of 5. A question is flagged if the average of the positive questions on a topic is equal to or greater than 5 and the transposed rating of any given negatively worded question in that topic is equal to or less than 3; similarly, the question is flagged if the average of the positively worded questions on that topic is equal to or smaller than 3, and the average of the transposed rating of a negative question on that topic is equal to or greater than 5.

Flagged questions detected by the filter described directly above are displayed underneath the following message: "Your responses on the questions below activated an automated filter because some of your ratings seemed contradictory—a pattern we sometimes see when respondents misread a question. Please review your responses, and change them if they don't reflect your true opinion; of course, if they ARE the responses you intended, simply leave them as is, and hit the 'NEXT' button at the bottom of this screen." As before, transformation is involved when the respondent reviews, and in some cases revises, a response on a selected negatively worded question. Notably, this filter, like all the filters described here, induces a transformation even if no revision is made. In this case, if the respondent confirms the rating of a specifically selected negative question by leaving it unchanged, then one can be reasonably certain that he or she did not misread the question. The filter therefore imparts a degree of certainty about the data's accuracy, at least in this one respect, that would otherwise be unavailable.

A fourth filter according to the present invention is an extremity detector. This filter computes the proportion of questions that receive an extreme rating of either 1 or 7. It is unusual, albeit not impossible, to have a preponderance of extreme ratings from any given respondent, because the automated electronic surveys according to the present invention are designed to generate a normal distribution with only a small proportion of "Always" or "Never" responses. Thus, the implicit performance standards are high. If a respondent's proportion of extreme ratings is equal to or greater than 40%, all questions that receive a rating or 1 or 7 are flagged.

Flagged questions detected by the filter described directly above (and their responses) appear underneath the following message: "Your responses on the questions below activated an automated filter because many of your ratings seemed extreme—a pattern we sometimes see when respondents are excessively harsh or excessively generous. Please review your responses, and change them if they don't reflect your true opinion; of course, if they ARE the responses you intended, simply leave them as is, and hit the 'NEXT' button at the bottom of this screen." Notably, on long assessments, more than one screen may be required to display these flagged questions and their responses; a "Continued on the NEXT screen" button will be substituted for the conventional "Next" button in such cases. Just as it is with the other filters described above, transformation is involved when the respondent is sensitized to a specific source of error, and either confirms that specific responses are accurate (by leaving them unchanged) or alters those responses to be more accurate and objective.

An integrated logic for implementing the four filters described above begins at 259, wherein it is determined whether the read and response time 256 is implausibly short. If so, the short response time 256 is interpreted as an indication that the respondent skimmed the question with uncharacteristic speed, and the associated question and response 258 is flagged as being potentially skimmed. It is further determined at 261 whether a question and response 258 contradicts a previously recorded question and response and, if so, the question and response 258 is flagged as having potentially been misread. As mentioned above, this determination preferably occurs after the submit button has been hit. For completed blocks as at 262, a determination is made at 264 as to whether an average of previously computed deviations for previously completed blocks 268 is too high when compared with a computed standard deviation for the block 266. If so, all questions and responses in the block 266 are flagged as being potentially completed by a respondent experiencing a state of fatigue. Once the survey is completed as at 270, it is possible to determine whether there were too many extreme responses at 272. If so, all of the extreme questions and responses are flagged as being potentially invalid (inaccurate).

Flagged questions and responses 274 are communicated to a dialogue manager 276 that retrieves appropriate instructions 278 for groups of similarly flagged questions and responses 274. The questions, responses, and instructions 242 are communicated to the respondent. A response validator 280 receives new responses and/or confirmation 244 of previously given responses, and generates survey data 246 containing valid and/or validated responses.

Figure 22:
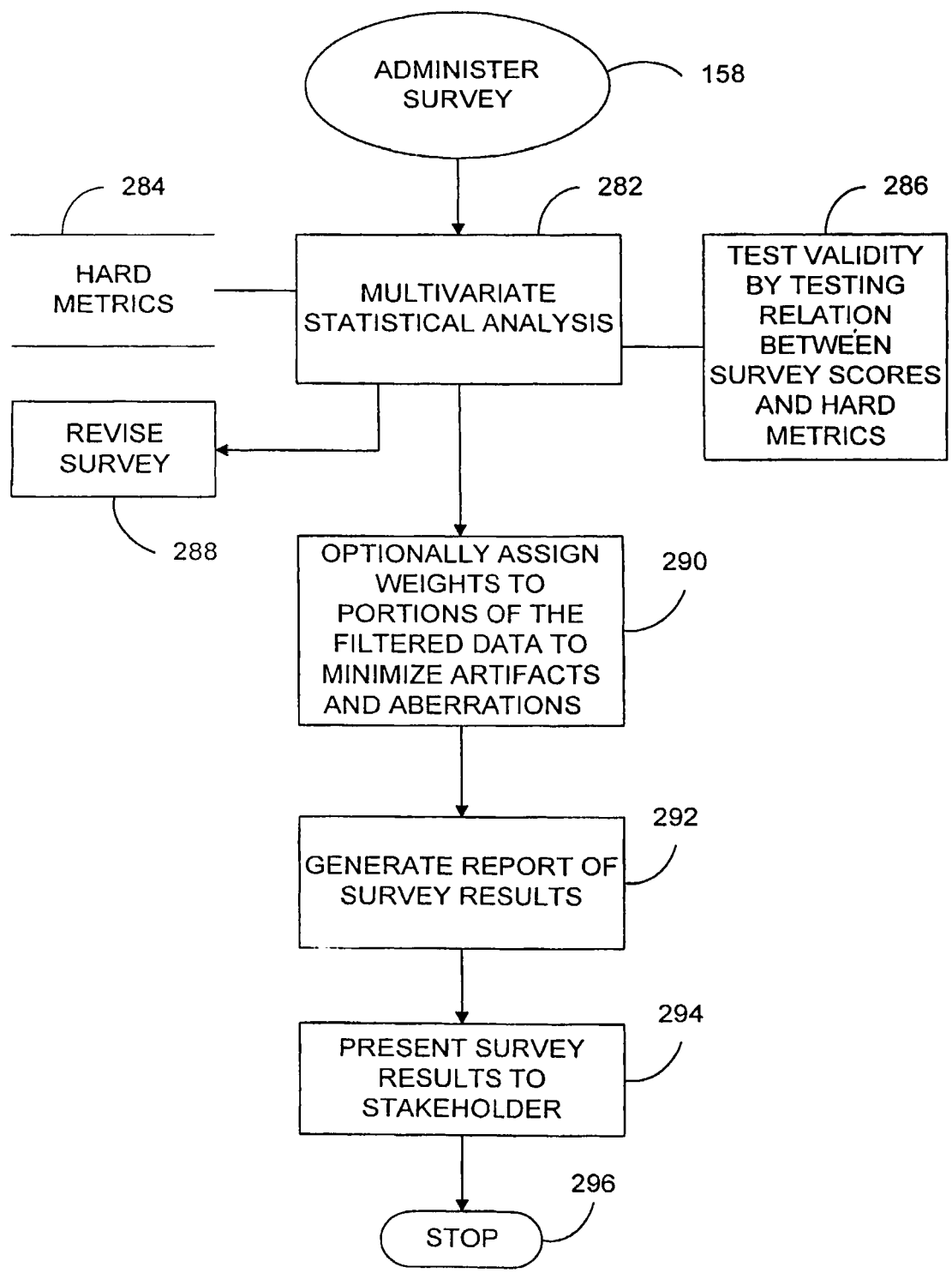
FIG. 22 is a flow chart depicting a method of compiling survey data according to the present invention.
Figure 25:
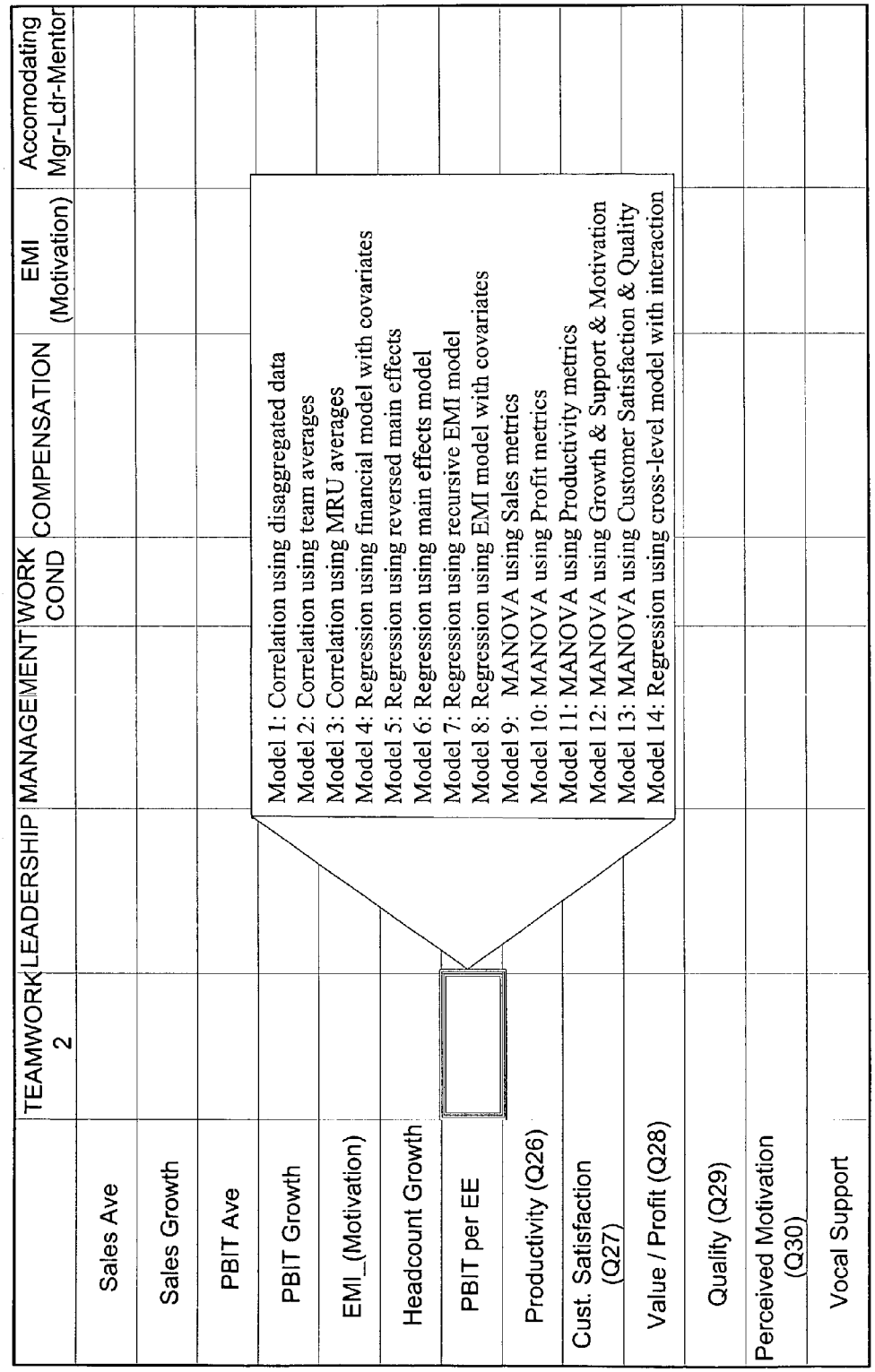

With valid responses successfully obtained by a survey according to the present invention, it is possible to compile and interpret survey data to identify significant, consistent, and non-contradictory linkages between feature metrics and performance metrics. A method of compiling and analyzing survey data is shown in FIG. 22. Beginning where survey administration leaves off, the method uses multivariate statistical analysis 282 to assess correlations and/or associations between feature metric and performance metric data sets. Since the performance metrics include hard metrics 284, it is possible to test the validity of obtained data at 286 by testing a relation between survey scores and the hard metrics 284. If the data of that analysis at 286 reveal invalidity, such as non-normal distributions, then it is possible to either revise the survey at 288 for re-administration, or optionally shape the statistics by weighting questions to minimize any unwanted effects at 290. With valid data, it is possible to generate a report of survey results that identifies linkages in a way that is both accurate and readily understandable to lay persons at 294, and to present the results to the stakeholder in the form of the generated report at 294. The method ends at 296. The report generation technique preferably employs a table format as shown in FIGS. 23-28, wherein columns represent feature metrics, and rows represent performance metrics. The first step in the presentation is the construction of the table in FIG. 23 according to available and/or desired performance metrics, and identified features of the corporate culture. Next, survey content is selected as in FIG. 24 for obtaining data sets for the feature metrics. Following survey administration, and hard metric collection, HLM analysis is accomplished by conducting individual tests for each cell of a resulting matrix as shown in FIG. 25, wherein the analysis starts with a simple correlation and ends with a very complex multivariate model. The next step includes summarizing the HLM results according to the Computational Rules outlined in FIG. 26 and as further described below.

Referring to FIG. 27, the preferred embodiment employs HLM to identify and measure linkages between generally "soft" features of the corporate culture, such as measures collected from a questionnaire that asks respondents about their perceptions, behaviors, opinions or attitudes, and generally "hard" metrics that quantify objectively measured performance, such as profit per person, number of injuries, and defect rate. Ordinarily, HLM requires the researcher to run several, and sometimes many, separate statistical tests to evaluate the network of linkages that can exist in an organization.

Because results must often be presented to high-level executives who typically lack advanced statistical training, but who are very alert to the varieties of conditions that moderate and affect the confounding variables germane to their business, it is imperative to utilize a method for summarizing and simplifying HLM results that does not sacrifice complexity. The method according to the present invention transforms the results of a large matrix—a matrix that typically contains a hundred or more cells and a thousand or more individual test statistics—into a simple set of numbers that can be displayed in a table on a conventional sheet of paper.

The method entails a set procedure adhering to the following rules. Every possible test is run in every cell of the matrix that crosses the "soft" measures (typically in the columns) with "hard" metrics furnished by the respondents' employer. If and only if the Omnibus Null is significant does the method proceed to the next level of testing (see Cohen & Cohen 1983, *Applied Multiple Regression/Correlation Analysis for the Behavioral Sciences*, pp. 57-59.)

After running the HLM tests according to established guidelines (see Bryk & Raudenbusch 1992, *Hierarchical Linear Models: Applications and Data Analysis Methods*), the researcher identifies significant linkages of varying levels by assigning "points" systematically for each statistically significant finding. For example, a correlation between 0.01 and 0.20 garners 1 point, whereas a correlation between 0.21 and 0.40 garners 2 points. Further, a correlation equal to or above 0.41 garners 3 points, and a beta-weight from a MANOVA, MANCOVA, or Multiple Regression garners 1 point. Non-significant results and correlations below 0.01, however, yield no points. These arbitrarily chosen thresholds are effective at designating relative degrees of noteworthiness because they are consistently applied throughout the analysis.

The method further ensures that identified linkages are consistent and non-contradictory by considering point totals, and by assigning valences to significant coefficients and evaluating the valences. For example, significant positive coefficients get a positive valence, whereas significant negative coefficients get a negative valence. Also, the method requires adding all points within each cell of the matrix described above (crossing "soft" measures and "hard" metrics). Then, in order for a cell to be labeled as containing a linkage, the total number of points must be equal to or greater than the fiftieth percentile ($P_{50}$) of all the totals in the matrix. Further, if the cell total is equal to or greater than $P_{80}$ then the cell is labeled as containing a relatively strong linkage. FIG. 28 shows the presentation format, wherein more linkages with especially high totals (e.g., in the top quartile of all totals in the matrix) are circled. Moreover, each linkage MUST be verified by at least one significant zero-order correlation, and all the zero-order correlations in that cell MUST have the same valence. If any of these conditions is not met, the cell is left blank. Moreover, if all the conditions are met and the cell's sum is greater than 1, then the linkage is labeled "Positive". Similarly, if all the conditions are met and the cell's total is less than 1 then the linkage is labeled "Negative".

In cases where a cell is blank, (where the above conditions are not met), presentation of results includes informing sponsors (stakeholders) of the analysis that no compelling and consistent evidence of a linkage exists for that cell. In cases where the cell conditions do meet the criteria specified above, sponsors are told that—all other things being equal for the given dataset—there is good evidence to support the claim that a linkage exists between the "soft' measure and the "hard" metric listed. It is also inherent to mention the traditional caveats that are germane to any causal inferences and any HLM analysis.

By virtue of this process, what would otherwise be an overwhelming flood of statistical information is transformed into an easily understood table. Moreover, it is a table summarizing a complex process that systematically ascribes greater importance to the statistical test data that professional experience indicates one should view as especially noteworthy.

The method of compiling data and presenting results according to the present invention further includes additional steps. For example, the method includes compiling descriptive statistics that summarize the employees' responses, such as the mean, response rate, and standard deviation for various datasets. Also, the method includes compiling the employee's written comments, and editing them to delete any information (misspellings, grammatical errors, non-standard punctuations, names of individuals, and names of places) that might identify the writer or colleagues. These comments are classified according to the topic they address, and put into an electronic file that can be searched by a selected topic or word. The results of all the aforementioned analyses, the descriptive statistics, the table of linkages, and the indexed list of the employee's comments are communicated to the employer.

It should be readily understood that the systems and methods of the present invention can be combined in any number of ways and under various circumstances according to varying needs of clients, new developments in business and technology, and shifting market forces. Thus, the present invention is not limited to a Web-based implementation as described herein to disclose the preferred embodiment of the present invention. Moreover, the description of the invention is merely exemplary in nature and, thus, variations that do not depart from the gist of the invention are intended to be within the scope of the invention.

What is claimed is:

1. A method of providing employee assessment services, comprising:

negotiating with an employer to administer surveys to its employees;

obtaining performance metrics relating to performance of a business of the employer;

designing a survey to obtain feature metrics relating to features of business culture relating to the business of the employer, wherein the survey is in a machine readable form;

electronically administering the survey to the employees on a computer, thereby obtaining survey data including the feature metrics, wherein administering said survey includes communicating survey questions to respondents and obtaining responses to the questions from the respondents, the questions having response choices corresponding to numeric values;

performing assessment of behaviors of the respondents during survey administration by executing machine readable instructions corresponding to the following steps:

dividing responses to survey questions from a particular respondent on a particular survey into blocks, wherein the blocks have substantially equal numbers of responses and substantially reflect a sequence in which survey questions are communicated to the particular respondent;

computing standard deviations of the numeric values corresponding to the responses in each block; and comparing the standard deviations of the numeric values corresponding to the responses in each block with a predetermined threshold and indicating that at least a portion of the survey data is likely invalid when the standard deviation of the numeric values corresponding to the responses in each block is equal to or less than the predetermined threshold;

prompting the respondent on the display of a computer to affirm the validity of said responses and readministering the portion of the survey that is likely invalid when the validity is not affirmed by the respondent; and compiling the survey data on a computer to identify statistically significant, noteworthy, consistent, and non-contradictory linkages between the feature metrics and the performance metrics, where noteworthiness is assessed based on an effect size calculation; and communicating the linkages between the feature metrics and the performance metrics to the employer.

2. The method of claim 1, wherein said performing assessments of behaviors of the respondents during survey administration includes:

recording a reading-and-response time for a question and response; and examining the reading-and-response time to determine whether it is too short based on predetermined criteria, thereby indicating that the respondent failed to adequately read the question.

3. The method of claim 1, wherein said performing assessments of behaviors of the respondents during survey administration include:

recording a plurality of reading and response times for a plurality of questions completed by a particular respondent;

computing an average reading and response time for the particular respondent based on the plurality of reading and response times; and determining whether a reading-and-response time for a particular question is too short based on the average reading and response time, thereby indicating that the respondent failed to adequately read the particular question.

4. The method of claim 1, wherein said performing assessments of behaviors of the respondents during survey administration includes:

examining a first response to a first survey question from a particular respondent;

examining a second response to a second survey question from the particular respondent, wherein the first survey question and the second survey question perform related inquiries capable of eliciting contradictory responses; and determining that the particular respondent misread at least one of the first survey question and the second survey question based on the first response being contradictory to the second response.

5. The method of claim 1, wherein said performing assessments of behaviors of the respondents during survey administration includes:

computing a proportion of extreme responses from a particular respondent, wherein an extreme response corresponds to a response at an end of a rating scale suitable for recording responses to survey questions; and comparing the proportion to a predetermined threshold to determine whether the particular respondent may have been at least one of overly harsh and overly generous in given responses.

6. A web-based employee assessment tool for use with a computer network accessible to the public, comprising:

a server connected to the network and having a data store of at least one automated electronic survey designed to obtain feature metrics relating to features of business culture relating to at least one business of at least one employer, wherein said server is operable to distribute the automated electronic surveys to employees of the employer over the network and receive responses over the network from the employees that comprise data including the feature metrics;

an access control system controlling distribution of surveys by the server and adapted to allow employees of a particular employer to identify themselves as employees of the particular employer and to select to complete a particular survey designed to obtain feature metrics relating to features of business culture relating to a particular business of the particular employer;

a plurality of filters adapted to perform assessments of behaviors of the employees during survey administration, including determination of effect size, and thereby detect a response of potentially decreased validity based on the assessments, and adapted to provide an employee giving the response with an opportunity to review the response and its associated question, and to change the response based on the review;

the plurality of filters including a fatigue detector; and the fatigue detector adapted to divide responses to survey questions from a particular respondent on a particular survey into blocks, wherein the blocks have substantially equal numbers of responses and substantially reflect a sequence in which survey questions are communicated to the particular respondent, adapted to compute standard deviations of numerical values corresponding to the responses in each block, and adapted to compare the computed standard deviations of the numerical values corresponding to the responses in each block with a predetermined threshold and to indicate that the responses are likely invalid when the standard deviation of the responses in each block is equal to or below the predetermined threshold;

a compilation module that compiles survey data on a computer to identify statistically significant, noteworthy, consistent, and non-contradictory linkages between the feature metrics and performance metrics, where noteworthiness is assessed based on an effect size calculation, wherein the performance metrics relate to features of business culture relating to the business of the employer; and a communication module that communicates the linkages between the feature metrics and the performance metrics to the employer.

7. The assessment tool of claim 6, wherein said fatigue detector is adapted to examine the standard deviations by dividing a standard deviation for a particular block by an average standard deviation of all preceding blocks to obtain a result, and by equating a result equal to or less than one-half with the respondent experiencing fatigue.

8. The assessment tool of claim 6, wherein said plurality of filters includes a skimming detector adapted to record a reading-and-response time for a question and response, and adapted to examine the reading-and-response time to determine whether it is too short based on predetermined criteria, thereby indicating that the respondent failed to adequately read the question.

9. The assessment tool of claim 6, wherein said plurality of filters includes a skimming detector adapted to divide questions and responses to survey questions from a particular respondent on a particular survey into blocks, wherein the blocks have substantially equal numbers of questions and responses and substantially reflect a sequence in which survey questions are communicated to the particular respondent, adapted to record at least one reading and response time for questions and answers in a particular block, and adapted to examine at least one reading-and-response time to determine whether it is too short based on predetermined criteria, thereby indicating that the respondent failed to adequately read the questions of the particular block.

10. The assessment tool of claim 6, wherein said plurality of filters includes a misreading detector adapted to examine a first response to a first survey question from a particular respondent, adapted to examine a second response to a second survey question from the particular respondent, wherein the first survey question and the second survey question perform related inquiries capable of eliciting contradictory responses, and adapted to determine that the particular respondent misread at least one of the first survey question and the second survey question based on the first response being contradictory to the second response.

11. The assessment tool of claim 6, wherein said plurality of filters includes an extremity detector adapted to compute a proportion of extreme responses from a particular respondent, wherein an extreme response corresponds to a response at an end of a rating scale suitable for recording responses to survey questions, and adapted to compare the proportion to a predetermined threshold to determine whether the particular respondent may have been at least one of overly harsh and overly generous in given responses.

12. The assessment tool of claim 6, wherein said access control system is adapted to allow employees of a particular employer to identify themselves as employees of the particular employer without revealing their identities as individuals.

13. The assessment tool of claim 6, wherein a condition exists relating to a particular automated electronic survey for a particular employer residing in the data store of said server, and to said access control system allowing employees of the particular employer to identify themselves as employees of the particular employer and to select to complete the particular automated electronic survey, wherein said condition includes existence of a contract between the employer and an outside consulting company, wherein the contract contains a term guaranteeing confidentiality of individual employee responses, and that survey data will only be made available to the employer in a post-analytically aggregate form, wherein the particular automated electronic survey is adapted to clarify a relationship between the employer and the outside consulting company, and to inform employees of the condition.

* * * * *